US010796255B2

(12) United States Patent
Newhouse et al.

(10) Patent No.: US 10,796,255 B2
(45) Date of Patent: Oct. 6, 2020

(54) MANAGING PROJECT TASKS USING CONTENT ITEMS

(71) Applicant: DROPBOX, INC., San Francisco, CA (US)

(72) Inventors: Ben Newhouse, San Francisco, CA (US); Kavitha Radhakrishnan, San Jose, CA (US); AJ Palkovic, San Francisco, CA (US); David Stinnette, San Francisco, CA (US); Jacob Hurwitz, San Francisco, CA (US); Jennifer Lee, San Francisco, CA (US); John R. Grace, Jr., San Francisco, CA (US); Susan Wang, San Mateo, CA (US); Leona Dondi, San Francisco, CA (US); Igor Kofman, San Francisco, CA (US); Kenneth Choi, Alameda, CA (US); Tsung-Hsiang Chang, San Bruno, CA (US)

(73) Assignee: Dropbox, Inc., San Francisco, CA (US)

( * ) Notice: Subject to any disclaimer, the term of this patent is extended or adjusted under 35 U.S.C. 154(b) by 723 days.

(21) Appl. No.: 15/476,734

(22) Filed: Mar. 31, 2017

(65) Prior Publication Data
US 2018/0189706 A1 Jul. 5, 2018

Related U.S. Application Data

(60) Provisional application No. 62/440,311, filed on Dec. 29, 2016.

(51) Int. Cl.
*G06Q 10/06* (2012.01)
*G06Q 10/10* (2012.01)

(52) U.S. Cl.
CPC ..... *G06Q 10/06316* (2013.01); *G06Q 10/101* (2013.01)

(58) Field of Classification Search
CPC ................ G06F 3/00; G06Q 00/00–99/00
(Continued)

(56) References Cited

U.S. PATENT DOCUMENTS

| 8,745,222 | B2 * | 6/2014 | Chi ...................... G06Q 10/10 |
| | | | 705/7.13 |
| 2014/0164511 | A1 * | 6/2014 | Williams ................ H04L 67/22 |
| | | | 709/204 |
| 2014/0372539 | A1 * | 12/2014 | Zaveri ................... H04L 51/046 |
| | | | 709/206 |

FOREIGN PATENT DOCUMENTS

GB 2499097 A * 8/2013 ............. G06Q 10/10

OTHER PUBLICATIONS

Froese, Thomas. (2010). The impact of emerging information technology on project management for construction. Automation in Construction. 19. 531-538. 10.1016/j.autcon.2009.11.004. (Year: 2010).*

* cited by examiner

*Primary Examiner* — Alan S Miller
*Assistant Examiner* — Jay-Ming Wang
(74) *Attorney, Agent, or Firm* — DLA Piper LLP (US)

(57) ABSTRACT

Disclosed are systems, methods, and non-transitory computer-readable storage media for managing project tasks using content items. A user can create tasks within a content item. The tasks can be assigned to users and/or be assigned due dates. The content item can be shared with other users such that updates to the content item (e.g., updates to the tasks) can cause sending notifications to users associated with the content item. When a task in the content item is updated, all members of the project can be notified of the updated status of the task. A task list for a project can be created that aggregates tasks from multiple content items associated with the project. Tasks can be organized in the
(Continued)

task list according to the content item the task was created in. Updates to tasks in the task list can cause corresponding updates to the tasks in the content items.

20 Claims, 22 Drawing Sheets

(58) Field of Classification Search
USPC .............................................. 705/7.11–7.42
See application file for complete search history.

Project Widget – 4 members

402 Search

Recently updated  Alphabetical  Links  Shared with me  Created by me  Archived Design and Presentations Engineering Photo Gallery Project overview Suggested Content Brainstorm notes Add to project — 706

702

704

Members
PB  GM  BB  KH

Join project

Actions
Create Content
Create Folder
Add Links

MANAGING PROJECT TASKS USING CONTENT ITEMS

RELATED APPLICATION

This Application claims the benefit of U.S. Provisional Application No. 62/440,311, filed on Dec. 29, 2016, the content of which is incorporated herein by reference in its entirety.

BACKGROUND

There are many software applications that assist users in managing projects. Often these software applications are complicated and difficult to use. Many times several different software applications are required to manage the various tasks, documents types, schedules, communications, and other project related activities and files. Using these existing systems to manage a project can be difficult to learn, burdensome to use, and time consuming for the user.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing projects using references between the project and project items. Project items can be, for example, synchronized content items, collaborative content items, other projects, folders, tasks, user accounts, etc. The content management system can create a project identifier for managing data and/or people associated with a project. In some implementations, the storage location of a content item does not affect whether it is associated with the project. In various implementations, the content management system can associate a project and project items by storing references between the project and project items, e.g., in one or more folders associated with the project, in a database, in content item metadata, etc.

When a project is selected by a user, the content management system can generate a project view that presents various project items associated with the project in a convenient and easy to access graphical user interface. A project view can provide access to many different types of content items that may be stored in many different locations while simultaneously providing information about users associated with the project and what actions these users have performed in relation to project items.

Disclosed are systems, methods, and non-transitory computer-readable storage media for automatically suggesting project affiliations. For example, the content management system can track user behavior while using the content management system. The content management system can track user behavior with respect to content items managed by the content management system and with respect to other users. For example, the content management system can store affiliation data that describes which content items a user has viewed, edited, created, shared, commented on, etc. The content management system can store affiliation data that describes which other users the user has interacted with (e.g., because the user shared content items with the other users, messaged the other users, referenced the other users in content the user has created, viewed or edited the same or similar content items as the other users, etc.). The content management system can store affiliation data that describes which projects a user is a member of and which projects a user has viewed or interacted with. The content management system can suggest relationships between users, content items, and/or projects based on the affiliation data.

Disclosed are systems, methods, and non-transitory computer-readable storage media for managing project tasks using content items. For example, a user can create tasks within content items. The tasks can be assigned to particular users and/or be assigned due dates. The content item can be shared with other users or followed by other users such that updates to the content item (e.g., updates to the tasks) can cause notifications to be sent to the users with whom the content item is shared or who follow the content item. When the content item is shared with or added to a project, the content item can be shared with all members of the project. Thus, when a task in the content item is updated, all members of the project can be notified of the updated status of the task. When viewing project data, the system can generate a task view that presents tasks defined within content items associated with the project.

BRIEF DESCRIPTION OF THE DRAWINGS

The above-recited and other advantages and features of the disclosure will become apparent by reference to specific embodiments thereof which are illustrated in the appended drawings. These drawings depict only example embodiments of the disclosure and are not therefore to be considered to be limiting of its scope. The principles herein are described and explained with additional specificity and detail through the use of the accompanying drawings in which:

FIG. 7 illustrates an example graphical user interface for presenting suggested content for a project;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an easy, simple, and convenient way for users to manage project data. By associating project data managed by the content management system with a project identifier, as described herein, users are able to access multiple types of project data for a specific project by selecting the corresponding project identifier. Moreover, since the project data is actually linked to the project, the project can include content that is stored internally and/or externally to the content management system. Thus, a wide variety of content item types (e.g., synchronized content items, collaborative content items, web pages, etc.) can be added to the project regardless of where the content is actually stored.

Additionally, since the content management system can synchronize some of the project data with the computing devices associated with members/users of the project, project members can access this project data through the content management system's servers or on the local file system of the users' devices (e.g., when a user's device is not connected to the network). The technology disclosed herein improves the efficiency of both user device and content management system server devices by reducing the number of software applications a user previously had to install on the user's device to perform project management tasks. Moreover, by managing project data using links (e.g., instead of making copies of project data), the user device and/or the content management system servers are required to use fewer resources to store and manage project data.

Figure 1A:
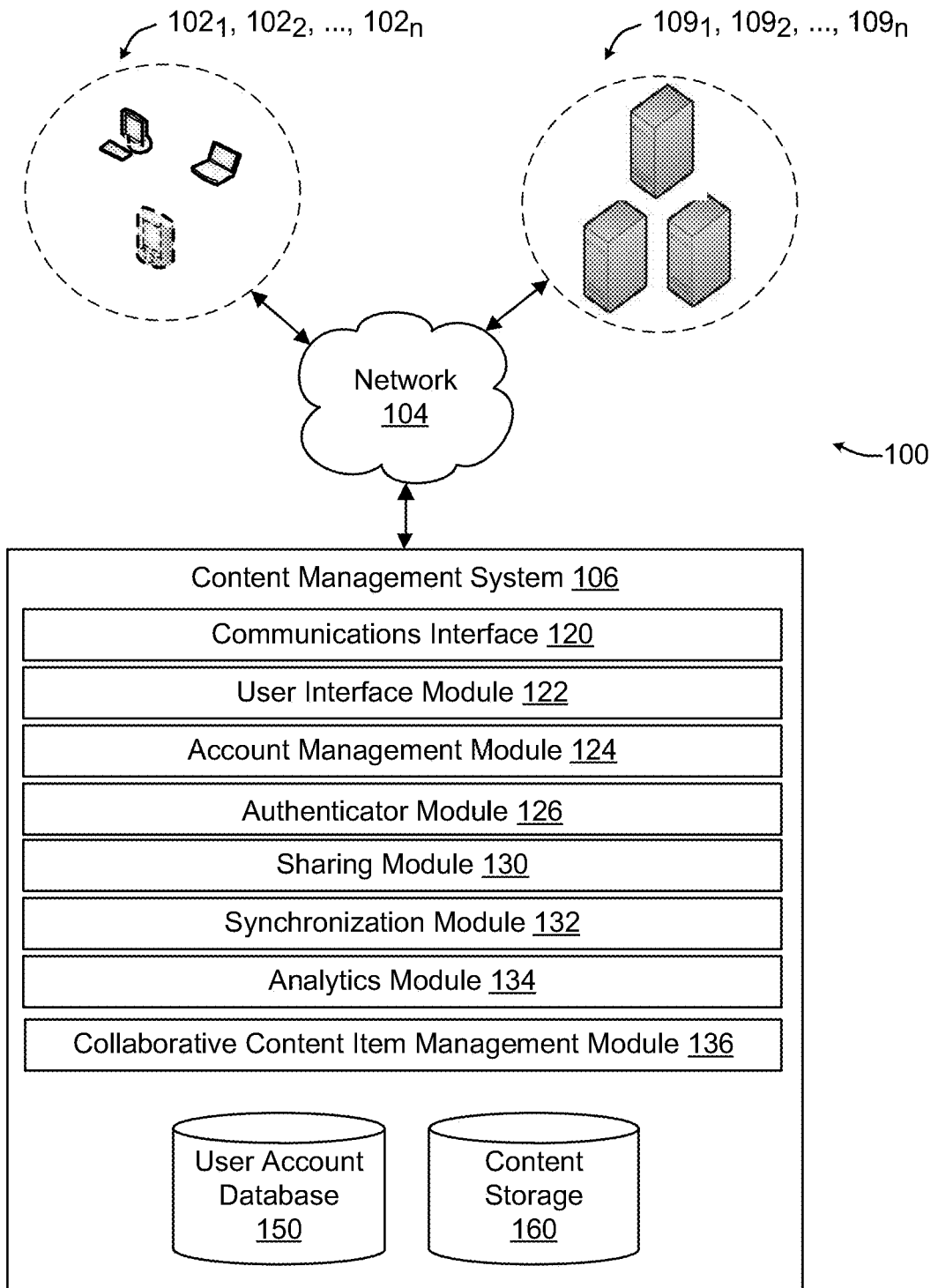
FIG. 1A shows an example configuration of devices and a network in accordance with some embodiments.

With respect to implementing various embodiments of the disclosed technology, an example system configuration 100 is shown in FIG. 1A, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1A can be implemented in a localized or distributed fashion in a network.

In system 100, a user (e.g., an individual, group of users, company, etc.) can interact with content management system 106 (e.g., an online synchronized content management system) through client devices $102_1$, $102_2$, . . . , $102_n$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type, usage information, (e.g., file access or edit history), storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, collaborative content items, text files, audio files, image files, video files, webpages, executable files, binary files, placeholder files that reference other content items, etc., from one or more client devices 102 authorized on the account. The content items can also include collections for grouping content items together with different behaviors, such as folders, playlists, albums, etc. For example, an account can include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or can be some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection.

A user can view or manipulate content via a web interface generated and served by user interface module 122. For example, the user can navigate in a web browser to a web address provided by content management system 106. Changes or updates to content in the content storage 160 made through the web interface, such as making edits to text or media that are part of the content item, can be propagated to other client devices 102 authorized to access the content item. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content items. Sharing content items can include making the content item accessible from any computing device in network communication with content management system 106. Sharing content items can also include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some implementations, to share a content item, sharing module 130 can be configured to add a user account identifier to the content entry associated with the content item, thus granting the added user account access to the content item. Sharing module 130 can also be configured to remove user account identifiers from a content entry to restrict a user account's access to the content item.

In some implementations, to share a content item, sharing module 130 can be configured to generate a custom network address, such as a uniform resource locator (URL), which allows web browsers to access the content in content management system 106, which in some implementations, can be allowed without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In some implementations, content management system 106 can include collaborative content item management module 136. Collaborative content item management module 136 can provide an interactive content item collaboration platform whereby users can simultaneously create collaborative content items, comment in the collaborative content items, and manage tasks within the collaborative content items. Collaborative content items can be files that users can create and edit using a collaborative content items editor, and can contain collaborative content item elements. Collaborative content item elements may include a collaborative content item identifier, one or more author identifiers, collaborative content item text, collaborative content item attributes, interaction information, comments, sharing users, etc. Collaborative content item elements can be stored as database entities, which allows for searching and retrieving the collaborative content items. Multiple users may access, view, edit, and collaborate on collaborative content items at the same time or at different times. In some embodiments this can be managed as multiple users access a content item through a web interface and there they can work on the same copy of the content item at the same time.

In some implementations, portions of a collaborative content item can be represented by a list of attributed text (e.g., a string of text where each character or character range has a set of attributes). An attribute can be a (key, value) pair: for example, ("bold", "true"), ("list", "bullet1"), or ("author", authorID). Furthermore, a collaborative content item can be stored as a sequence of change sets. A change set represents an edit to a particular version of a collaborative content item. Applying a change sets can insert and delete characters and apply attributes to ranges. Thus, a given change set can be applied to a particular collaborative content item representation to generate another collaborative content item representation. For example, a collaborative content item representation "abc\n" and a change set "insert d at position 2", which when applied, would yield a collaborative content item representation "abdc\n". Applying all of the change sets, in a given order, to an initial version of a collaborative content item representation, can produce a current version of the collaborative content item comprising a list of attributed text representation. Multiple users may access, view, edit, and collaborate on a collaborative content item at the same time or at different times. In some embodiments this can be managed by providing multiple users with access to a content item through a web interface where they can interact with a same copy of the content item at the same time.

While content management system 106 is presented with specific components, it should be understood by one skilled in the art, that the architectural configuration of system 106 is simply one possible configuration and that other configurations with more or fewer components are possible.

Figure 1B:
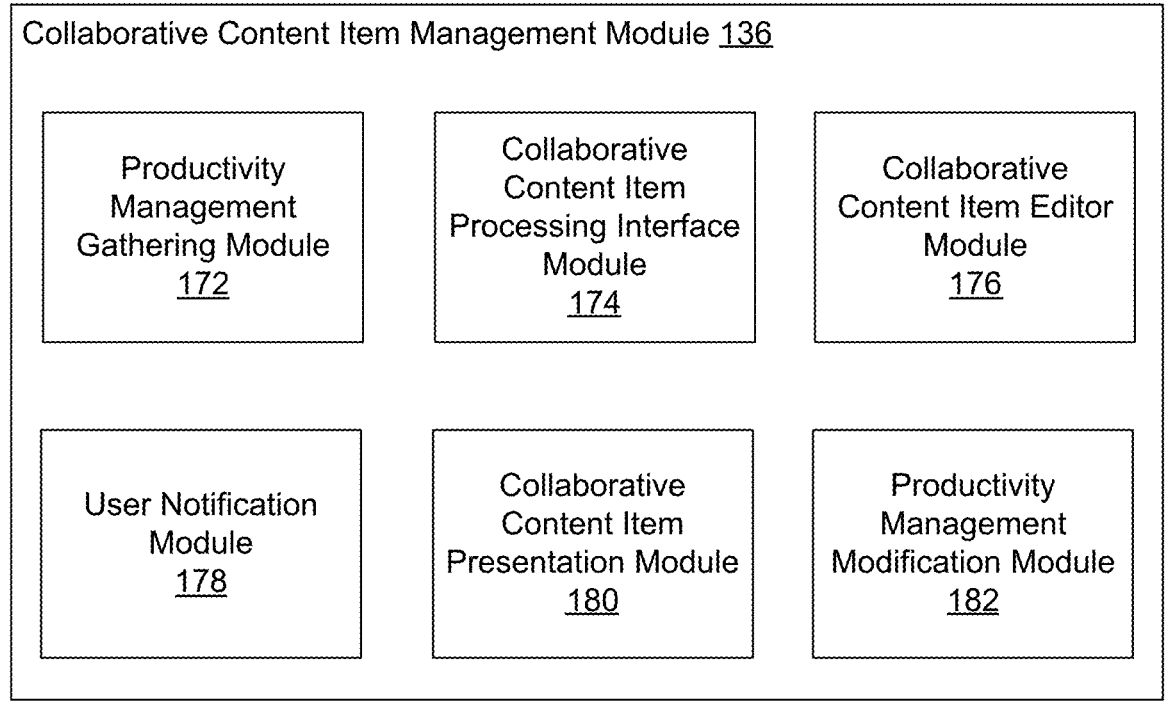
FIG. 1B shows an example collaborative content item management module, according to some embodiments.

FIG. 1B shows an example collaborative content item management module 136, according to some embodiments. Collaborative content item management module 136 may include productivity management gathering module 172, collaborative content item processing interface module 174, collaborative content item editor module 176, user notification module 178, collaborative content item presentation module 180, and productivity management modification module 182. One or more of productivity management gathering module 172, collaborative content item processing interface module 174, collaborative content item editor module 176, user notification module 178, collaborative content item presentation module 180, and productivity management modification module 182 may be coupled to one another or to modules not explicitly shown.

Productivity management gathering module 172 may be configured to gather productivity data from productivity management system 140. In various embodiments, productivity management gathering module 172 identifies an event and gathers information related to the event. For instance, productivity management gathering module 172 may gather a specific calendar entry and/or a specific task from an online calendar. Productivity management gathering module 172 may further gather information from the calendar entry or gather information related to the calendar entry such as time(s), date(s), relevant locations, title(s), agenda(s), summaries, description(s), and/or attendees related to the event. Productivity management gathering module 172 may provide the productivity data to the other modules of collaborative content item management module 136.

Collaborative content item processing interface module 174 may be configured to interface with collaborative content item management module 136. In various embodiments, collaborative content item processing interface module 174 may provide collaborative content items to one or more modules of collaborative content item management module 136, as described further herein.

Collaborative content item editor module 176 may be configured to create and/or modify collaborative content items. A collaborative content item may be created in a variety of ways. In some embodiments, collaborative content item editor module 176 enables creation of the collaborative content item into the content management system 106. Collaborative content item editor module 176 may enable access to or be any collaborative content item editing application (e.g., Microsoft Word®, Google Docs®, or the like) either in the cloud or executed locally. In one example, content management system 106 may provide to one of client devices 102 a user interface element (e.g., a box or a button) that allows creation of a new collaborative content item.

In some embodiments, collaborative content item editor module 176 may create the collaborative content item in conjunction with the productivity management system 140. For example, collaborative content item editor module 176 may provide a suggestion to a user to create or invoke a collaborative content item associated with an upcoming event. In various embodiments, collaborative content item management module 136 may identify a user that is opening or otherwise using collaborative content item editor module 176. Productivity management gathering module 172 may identify an upcoming event for the user on the user's calendar. Subsequently, collaborative content item editor module 176 may provide a suggestion to the user to create or invoke the collaborative content item associated with the upcoming event.

Although it is discussed that collaborative content item editor module 176 may provide a suggestion to the user to create or invoke the collaborative content item associated with the upcoming event, it will be appreciated that the suggestion to create or invoke the collaborative content item may be made by any application. For example, a user may log into and/or otherwise access any application or suite of applications. Once the user is identified and an upcoming event is identified on the user's calendar, any application may provide the user with the suggestion to create or invoke the collaborative content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaborative content item in response to the suggestion, collaborative content item editor module 176 may create or invoke the requested collaborative content item. If the application that provided the suggestion to the user is not a collaborative content item editor, then a collaborative content item editor may be executed and the requested collaborative content item created and/or invoked in response to the user's request.

In accordance with some embodiments, collaborative content item editor module 176 may configure the productivity management system 140 to provide access to the collaborative content item (e.g., using a link, including the collaborative content item, or any other mechanism to enable access to the collaborative content item) in a meeting request, a task entry, or the like. In some embodiments, collaborative content item editor module 176 may instruct productivity management system 140 to place an icon corresponding to a link to the collaborative content item in the calendar entry, meeting request, task entry, or the like. When a user has opened the link (e.g., by clicking the icon), the user may be directly guided to the collaborative content item from the meeting request, task entry, or the like. In one example, the link in the calendar entry may provide the user (e.g., using client device 102) access to a collaborative content item stored in content management system 106 (e.g., in storage accessible through the cloud) or in productivity management system 140.

Once the user requests to create or invoke the collaborative content item, collaborative content item editor module 176 may create and/or invoke a collaborative content item. The collaborative content item may be subsequently edited, altered, viewed, changed, stored, and/or the like by an editing application (e.g., either stored locally on a client device 102 or in the cloud). In various embodiments, one or more different client devices 102 may utilize different editing applications to make changes to the collaborative content item. Collaborative content item editor module 176 and/or other editing applications may allow for the collaborative content item to be changed by multiple different users using different client devices 102 at the same time or substantially at the same time (e.g., in real time or substantially in real time).

It will be appreciated that users may be automatically guided to a collaborative content item related to a calendar entry, meeting request, a task entry, or the like without human intervention. In some embodiments, users may be guided to a collaborative content item related to a calendar entry, a meeting request, a task entry, or the like without having the users separately open collaborative content item editing applications. Such functionalities may prove particularly convenient for users seeking to take, review, or collaborate on notes associated with an event, as these users need not open applications other than productivity management applications.

Collaborative content item editor module 176 may receive from users additional content for the collaborative content item. For example, collaborative content item editor module 176 may be configured to receive from the client devices 102 changes or edits to the collaborative content item. In various embodiments, the changes may include text, characters strings, or the like. The changes may also include annotations to the collaborative content item, comments to the collaborative content item, files to be attached to the collaborative content item, pictures to be attached to the collaborative content item, links to be attached to the collaborative content item, tasks related to the collaborative content item, or the like that can be incorporated into the collaborative content item. In various embodiments, edits to the collaborative content item are collaborative. For instance, collaborative content item editor module 176 may obtain edits (e.g., text changes and/or additions of audio files, pictures, tables, or the like) from any number of client devices 102 at a given time (or in real time). Collaborative edits may be incorporated in a variety of formats, including formats that provide different text attributes such as colors, fonts, styles, or the like for different users.

In various embodiments, collaborative content item editor module 176 (and or a security or permissions module associated with a server) may establish permissions and/or security for the collaborative content item. For example, collaborative content item editor module 176 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaborative content item is limited based on storage access rights. For example, a user with access rights to cloud storage may access, view, and/or make changes to the collaborative content item. In some embodiments, a user with access rights assigned by the content management system 106 may access, view, and/or make changes to the collaborative content item.

User notification module 178 may be configured to notify users of each of the client devices 102 of information related to the state and/or contents of the collaborative content item. Notifications may be sent, for example as an email notification, a chat message notification, a notification in a display of the collaborative content item, or in relation to the collaborative content item through a file system or other organizational system. In various embodiments, user notification module 178 provides notifications about changes to the client devices 102. For example, user notification module 178 may notify users whether a collaborative content item has been created for an event. As another example, user notification module 178 may notify specific users that they have been invited to attend an event.

Collaborative content item presentation module 180 may provide to the client devices 102 selected collaborative content items. The collaborative content items may be displayed in the client devices 102 through a native application, an Internet browsing window, or the like supported by the client devices 102.

It will be appreciated that collaborative content item presentation module 180 may restrict writing permissions to the collaborative content items at any time. In an example, prior to occurrence of the event, collaborative content item presentation module 180 may restrict writing permissions to the collaborative content item (and turn the collaborative content item into a read-only collaborative content item) for all users except the creator or invoker of the collaborative content item. In some embodiments, the creator or invoker of the collaborative content item may select a subset of recipients to receive writing permissions.

Collaborative content item presentation module 180 may also support a collaborative content item viewing portal users can use to view existing collaborative content items. The collaborative content item viewing portal may order specific collaborative content items based on one or more ordering factors. "Ordering factors," as used herein, may include any factors used to order collaborative content items. Ordering factors can include factors used to order collaborative content items chronologically. More specifically, in some embodiments, the collaborative content item viewing portal orders collaborative content items according to the date(s) and/or times the collaborative content items were created. The collaborative content item viewing portal may also order collaborative content items according to the date(s) and/or time(s) the collaborative content items were edited. In various embodiments, the collaborative content item viewing portal orders collaborative content items according to the date(s) and/or time(s) of corresponding events to which the collaborative content items were related. Ordering factors can also include factors used to order collaborative content items according to the preferences of a specific user, such as whether the user has accepted events to which the collaborative content items were related.

In some embodiments, a collaborative content item viewing portal may be dedicated to a particular user who has received access to the collaborative content item because the particular user was related to an event. The user's collaborative content item viewing portal may provide access to any number of collaborative content items including the collaborative content item. The collaborative content items represented in the collaborative content item viewing portal may be ordered in any number of ways. For example, the collaborative content item viewing portal may order collaborative content items based on date and time of corresponding events.

The collaborative content item viewing portal may support search functions. For instance, the collaborative content item viewing portal may enable or allow searching for collaborative content items according to textual strings, titles, event attendees, and/or other attributes. The search functions may allow a specific user to search one or more collaborative content items for that user or for other users.

In some embodiments, productivity management modification module 182 may be configured to coordinate collaborative content items with calendar entries and to enable access to the collaborative content item through calendar entries.

Figure 2:
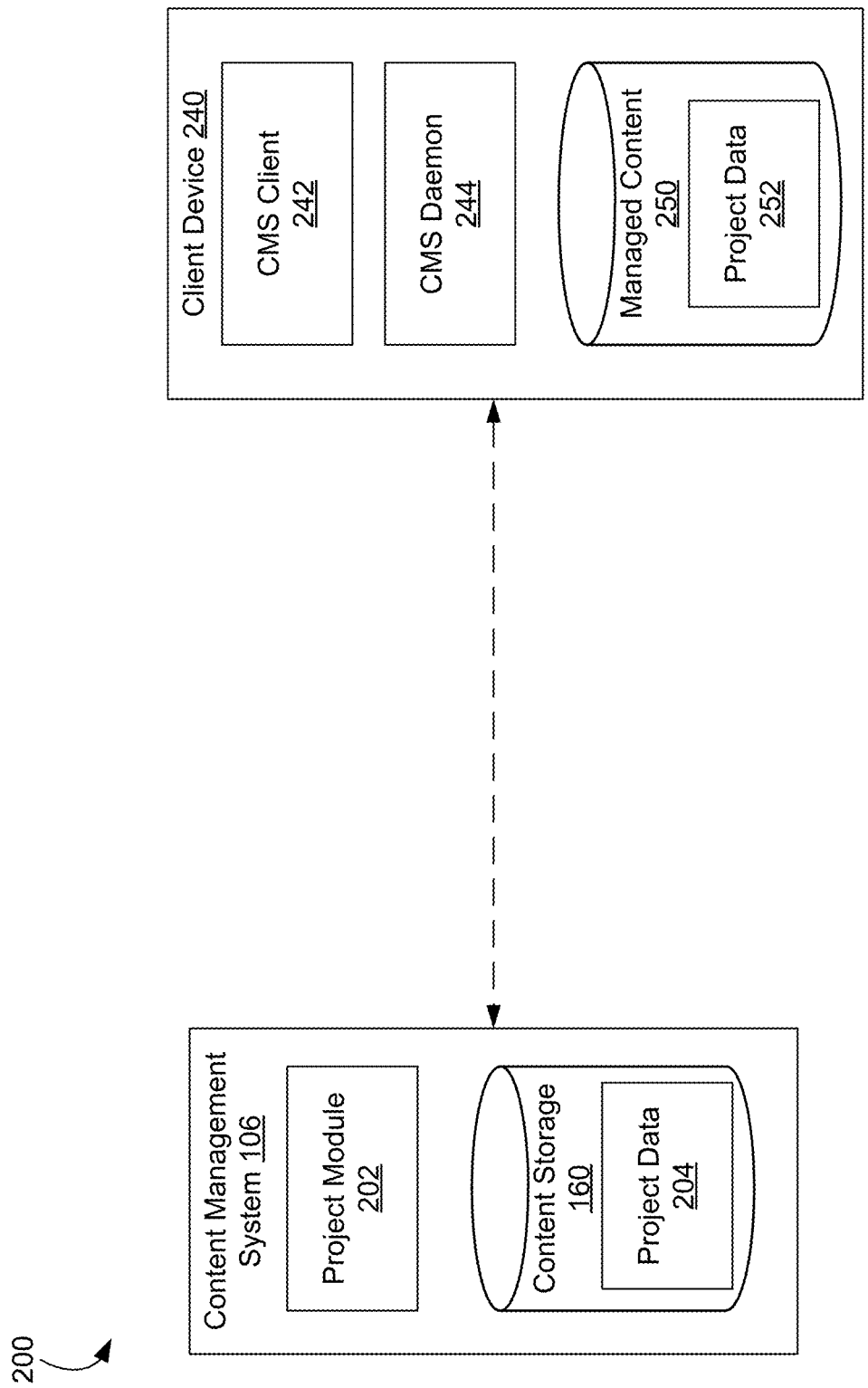
FIG. 2 is a block diagram of an example system for managing project data in a content management system.

FIG. 2 is a block diagram of an example system 200 for managing projects in a content management system. For example, system 200 can correspond to system 100 of FIG. 1A, described above. As described above, system 200 can include content management system 106.

In some implementations, content management system 106 can include project module 202. For example, project module 202 can be a software module installed and/or running on content management system 106. Project module 202 can manage project data (e.g., project members, links to project content, project tasks, etc.) associated with projects (e.g., project identifiers). Project module 202 can generate project views (e.g., graphical user interfaces) for presenting project data to a user (e.g., project member). Project module 202 can, for example, store content items and/or project data 204 associated with a project in content storage 160.

In some implementations, project module 202 can suggest project affiliations based on the users' behavior. For example, content management system 106 can monitor user behavior with respect to content items, projects, communications with other users, etc. Content management system 106 can store user behavior data describing the user behavior in a database (not shown) of content management system 106. Project module 202 can use the user behavior data stored by content management system 106 to recommend affiliations between users, content items, projects, etc. For example, project module 202 can suggest that different users should be members of the same project. Project module 202 can suggest that a content item should be added to a particular project or particular projects. Project module 202 can suggest other affiliations, as described further below.

In some implementations, system 200 can include client device 240. For example, client device 240 can correspond to client device $102_i$ described above. Client device 240 can, for example, be a laptop computer, tablet computer, smart phone, wearable device, and/or any other computing device. Although FIG. 2 illustrates a system 200 having only one client device 240 (e.g., client device $102_i$), system 200 can include many client devices 240 (e.g., client devices $102_i$-$102_n$) that interact with content management system 106 and/or project module 202 to manage projects. For example, each member of a project may have a different client device 240 that communicates with content management system 106 to access project data managed by content management system 106 and/or project module 202.

In some implementations, client device 240 can include content management system (CMS) client 242. For example, CMS client 242 can be a native application of client device 240. For example, a native software application can be an application that is built specifically for the hardware and/or software configuration of client device 240. Thus, the graphical user interfaces (and other functionality) of CMS client 242 described below can be implemented using instructions, application programming interfaces (APIs), and other technologies native to client device 240. To generate the various graphical user interfaces below and/or implement various features described herein, CMS client 242 can request project data (e.g., project content items, project member identifiers, tasks, etc.) from project module 202 over a network connection (e.g., through network 104). Project module 202 can obtain project data 204 from content storage 160, for example. CMS client 242 can then present the project data on various graphical user interfaces generated by CMS client 242.

Alternatively, CMS client 242 can be a web client executed by a web browser running on client device 240. Thus, the graphical user interfaces (and other functionality)

of CMS client 240 can be implemented using instructions, APIs, and other technologies that are not native to client device 240. For example, CMS client 240 can be built as a web application using non-native web code or instructions. CMS client 240 can be served to a web browser on client device 240 and the web browser can execute CMS client 240 to present the graphical user interfaces (and other functionality) to the user, as described in detail below. To generate the various graphical user interfaces below and/or implement various features described herein, CMS client 242 (e.g., the web browser) can request various project views (e.g., graphical user interfaces, web pages, etc.) from project module 202. Project module 202 can generate the project views (e.g., the graphical user interfaces described below) for presenting project data (e.g., project content items, project member identifiers, tasks, etc.) and send the project views to CMS client 242 over a network connection (e.g., through network 104). For example, project module 202 can obtain project data 204 from content storage 160, generate the project views based on the project data, and send the project views to CMS client 242. CMS client 242 can then present the project views on a display of client device 240.

In some implementations, client device 240 can include CMS daemon 244. For example, CMS daemon 244 can be a client of content management system 106 that maintains synchronization of data between content management system 106 and client device 240. For example, client device 240 can include managed content 250. Managed content 250 can be a portion of the file system on client device 240 managed by content management system 106 and/or CMS daemon 244. CMS daemon 244 and/or content management system 106 can synchronize content items, project data, etc., stored in managed content 250 with content items, project data, etc., stored in content storage 160. In particular, when the user of client device 240 is a member of a project corresponding to project data 204, CMS daemon 244 and/or content management system 106 can synchronize project data 204 and project data 252 so that project data 204 and project data 252 include the same project content items, and/or project data (e.g., links, tasks, etc.). Thus, a user of client device 240 can access project data 204/252 stored in content storage 160 through CMS client 242 or through managed content 250 stored in the local file system on client device 240.

Figure 3:
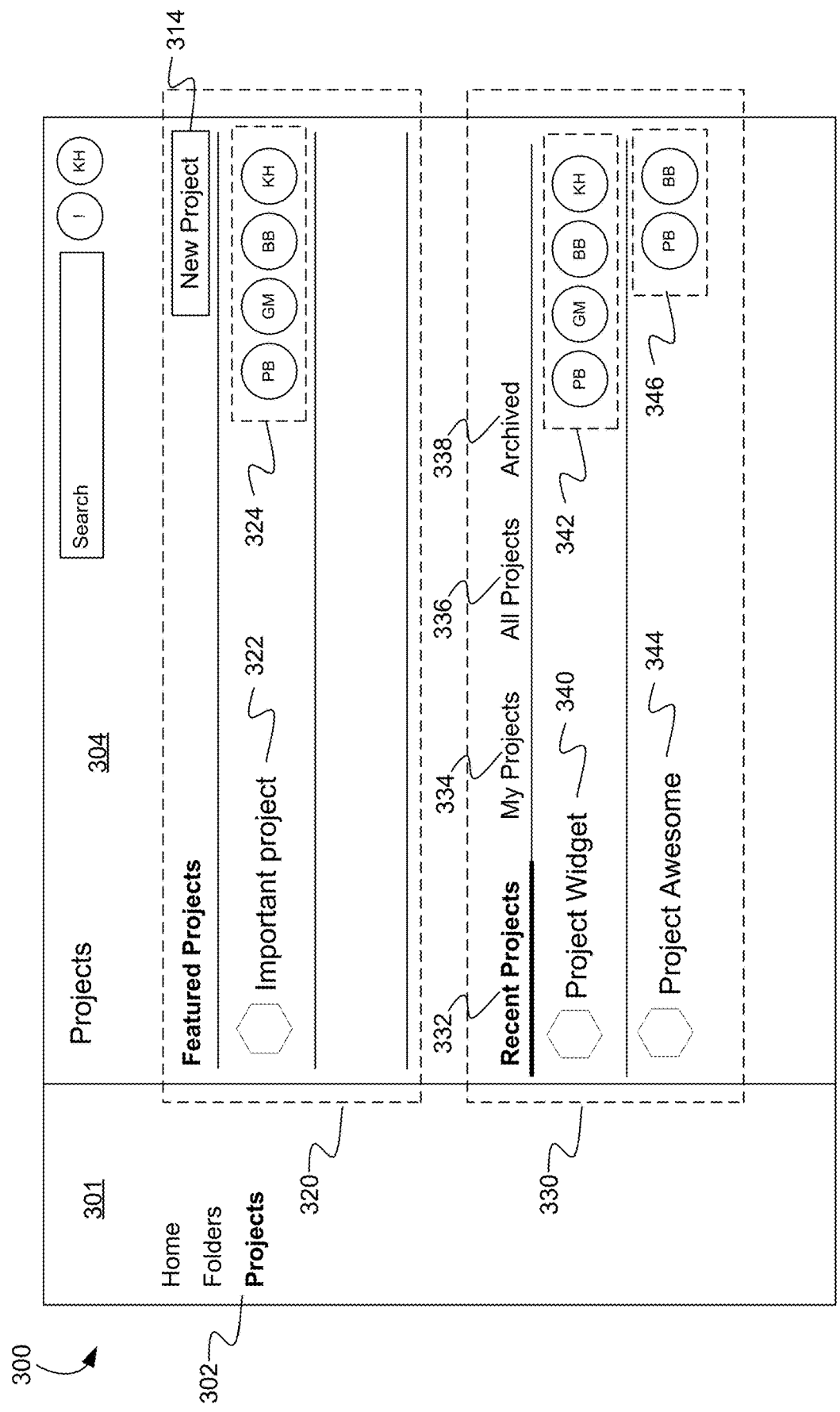
FIG. 3 illustrates an example graphical user interface for presenting a projects list.

FIG. 3 illustrates an example graphical user interface 300 for presenting projects. For example, CMS client 242 can present graphical user interface (GUI) 300 on a display of client device 240. In some implementations, GUI 300 can include side panel 301 presenting various graphical elements for viewing content management system data associated with a content management system user. While side panel 301 is not represented in each figure described below, side panel 301 can be presented along with each graphical user interface described herein. In the example illustrated by FIG. 3, the user has selected graphical element 302 to view projects managed by content management system 106. Upon receiving the selection of graphical element 302, CMS client 242 can present projects view 304.

In some implementations, projects view 304 can present projects that are relevant to the user. For example, projects view 304 can present project 322, project 340 and/or project 344. Each of the projects presented in projects view 304 can have a corresponding project identifier, as described above. A user can cause content management system 106 to create a new project, and corresponding project identifier, by selecting graphical element 314. Projects and project data can be shared with and/or accessible by other users of content management system 106. For example, projects can include a team of people that perform various tasks to accomplish the goals of the project. Thus, the project data corresponding to projects 322, 340 and/or 344 can be shared with other users (e.g., project members) of content management system 106. To share the project data with members of a project, members of the project can be granted permissions to view, edit, share, comment on, link, or otherwise interact with project data.

In some implementations, the members of each project 322, 340 and/or 344 can be represented in areas 324, 342, and/or 346, respectively, by graphical elements (e.g., images, initials, avatars, etc.). For example, project members can be users of content management system 106 that have permissions to access a project or project data. Permissions can specify which actions a project member can take with respect to content items associated with the project and how representations of the content items are arranged in a hierarchy under the project identifier. For example, permissions can specify whether a project member can open, edit, or share the associated content items; comment on the project or on associated content items; invite other users to be project members; add and/or assign tasks; and/or assign project roles. The collection of graphical elements representing members of a corresponding project can be referred to as a "face pile."

In some implementations, the face pile can be arranged according to a project member's contribution to the project. For example, content management system 106 can track the number of content item edits, comments, tasks, etc., associated with users (e.g., project members) of content management system 106. When presenting a face pile associated with a project, content item, task, etc., content management system 106 can present the graphical elements representing each project member or user according to the user's contribution to the project (e.g., when presenting project level items) and/or content item (e.g., when presenting individual content items, folders, etc.). For example, users who contribute a higher number of edits, comments, tasks, content, etc., can be presented at a higher position in the face pile (e.g., to the left, towards the top, etc.) than members or users who contribute relatively fewer edits, comments, tasks, etc. Alternatively, a project member's contribution to a project can be determined based on how long the project member has been a member of the project. For example, one metric for determining a project member's contribution can be the period of time a project member has been associated with a project. Thus, a project member having served the project for a longer period of time than other project members can be placed at a more prominent position in the face pile relative to other project members (e.g., on top, to the left, etc.). Additionally or alternatively, the representations of the project members in the face pile can be arranged or ordered according to how recently each project member has accessed the project. For example, members who have most recently accessed the project may be presented in a more prominent position than members who have not accessed the project in a while.

In some implementations, the face pile can be arranged according to a project member's role in the project. For example, project module 202 can manage roles for members of a project. The roles can be configurable by members of a project such that role labels (e.g., titles) can be created by members of the project. Thus, two different projects can define different roles for project members. For example, a project can have a "project manager" role, an "engineering manager" role, a "designer" role, and/or other roles. When presenting a face pile for a project, the graphical element representing the project member who has the "project manager" role can be presented at the first position (e.g., left most, right most, top, etc.) of the face pile so that the project manager can be quickly identified by other users. In some implementations, a project member's role can be a factor in determining the project member's level of contribution to the project.

A mention can be a reference that links an associated content item or project item to a particular user. In some implementations, a user can create a mention by entering a pre-defined character sequence (e.g. "@") followed by a designation of a user identifier. For example, when creating a task in a content item, a user can assign the task to a particular user by mentioning the assigned user in the task. As a more specific example, if a task is created by entering the character sequence "[ ]", this task can be assigned to a user "Bob" by entering the character sequence: "[ ]@Bob".

In some implementations, project module 202 can use project roles to address comments, assign tasks, share content items, and/or make other associations. For example, a user of content management system 106 can enter a comment in a content item addressed to the project manager of "Project Widget" (e.g., "@ProjectWidgetManager"). Content management system 106 can determine the user who is the project manager for "Project Widget" based on the roles assigned in the project "Project Widget" and notify the user who has the project manager role of the comment addressed to the project manager. Similarly, users can assign tasks to roles. For example, a design task can be assigned to the user having the "designer" role by at (@) mentioning the designer role in a task (e.g., "@ProjectWidgetDesigner"). In some implementations, resolving the target user of a role-based mention can depend on the project the mention is associated with. For example, when adding a task to a project A, a user can assign the task to the project's owner by mentioning @projectOwner. In response, content managements system 106 can determine the user assigned to the owner role for project A and create an association between the user and the task. This association can be determined by retrieving a mapping between the project and the project's roles. If the role is reassigned to a different user, the (task, target user)-association can be automatically updated, such as by updating an explicit mapping between the new user and the task or through the updated project owner role mapping. Thus, the same project role mention (e.g., @projectAdmin) can map to different users depending on the roles assigned in an associated project.

In some implementations, content items can be shared with roles. For example, there may be some project content items that should only be accessible to the project manager and/or other high-level members of the project. Instead of changing permissions assigned to individual users when the people or users associated with these roles changes, these content items can be shared with the roles (e.g., project manager, engineering manager, etc.). Then, when the users assigned to the roles change, the old project manager can automatically lose her permissions to access the project content items and the new project manager can automatically gain permission to access the project content items.

In some implementations, projects view 304 can include featured projects area 320. For example, featured projects area 320 can include representations of projects that are featured or important to a company, group, or other endeavor. For example, a company officer may start a project associated with an important company-wide initiative. The company officer (e.g., user) can provide input identifying the project as a featured or important project for the company. In other implementations, content management system 106 can determine that a project is important and should be featured based on the number of project members in the project and/or the popularity of the project (e.g., how many users are viewing or accessing the project). For example, project module 202 can determine that project 322 is an important project based on one or more of the criteria above and cause project 322 to be presented in featured projects area 320 when GUI 300 is presented by client device 240. In some implementations, featured projects 320 can be user-specific such that the projects selected as featured for a particular user can vary depending on the user's characteristics. Any number of characteristics can be used to select projects such as team or group membership, location of the project, location of project team members, content item access or sharing history, device type, etc. For example, a particular project can be featured for a user when the user has above a threshold number of interactions with content items in the particular project or when common group membership between the user and members of the particular project is above a threshold number of members.

In some implementations, projects view 304 can include user project area 330. For example, user projects area 330 can include projects associated with the user or projects where the user is a member. A user may be associated with a project if the user has previously been a member of the project (and perhaps no longer is a member), if the user has previously worked on content items associated with the project, if the user has worked or collaborated with members of the project, and/or if the project or project data is otherwise connected to the user. In some implementations, the user can filter or sort the projects presented in user projects are 330. For example, the user can select graphical element 332 to cause CMS client 242 to present projects that the user has recently visited or viewed. The user can select graphical element 334 to cause CMS client 242 to present projects that the user manages, owner, or created. The user can select graphical element 336 to cause CMS client 242 to present all projects for which the user is a member. The user can select graphical element 338 to cause CMS client 242 to present projects that have been archived by content management system 106. In response to the user selection of one of graphical elements 332, 334, 336 and/or 338, CMS client 242 can request information describing the corresponding projects (e.g., project identifiers, project metadata, project membership information, etc.) from content management system 206 and present the project information (e.g., representations of the projects and/or project membership), in user project area 330 on GUI 300.

In some implementations, the user can select a project to view project content items and other project data associated with the project. For example, the user can select project 340 to cause CMS client 242 to present GUI 400 of FIG. 4.

Figure 4:
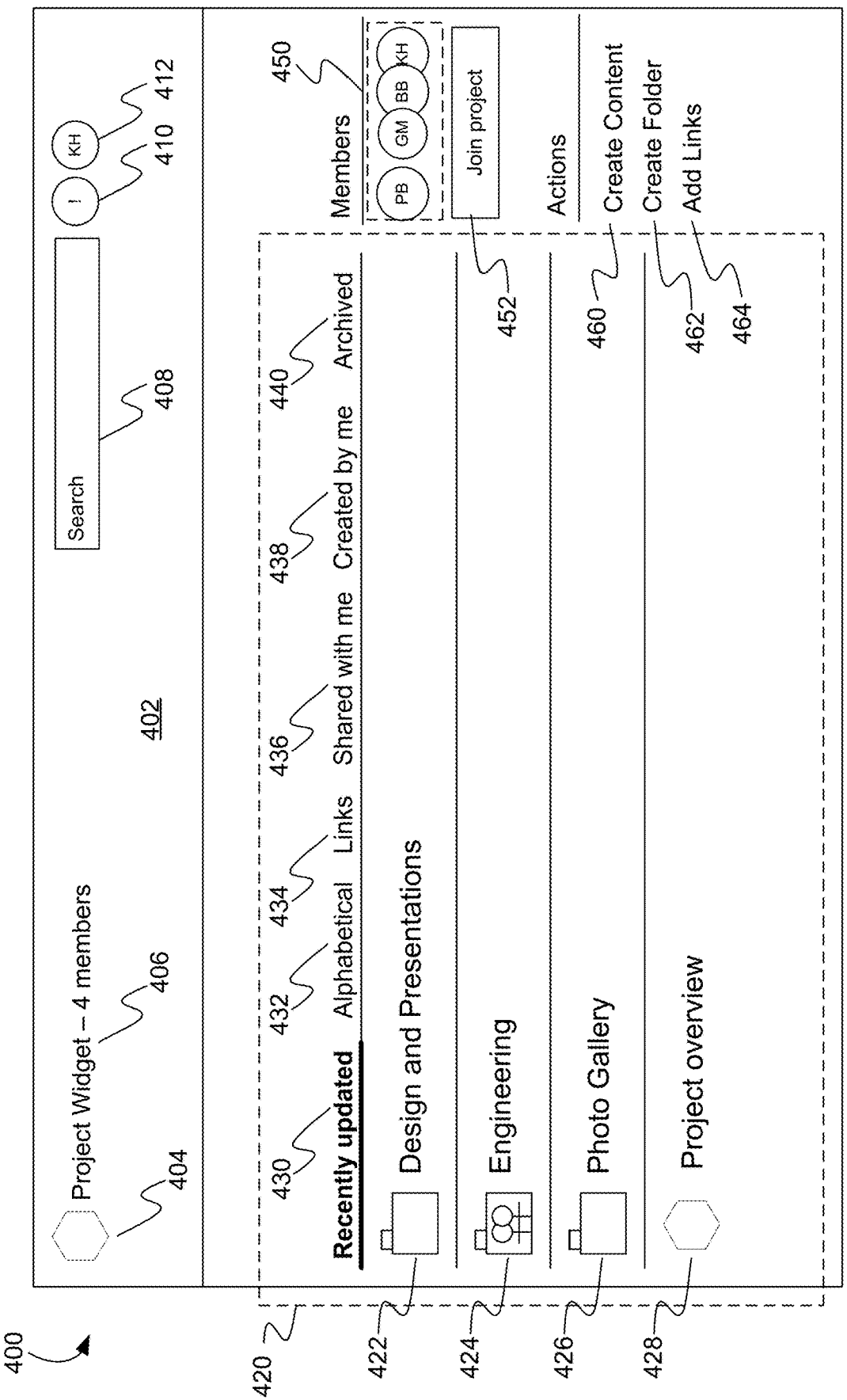
FIG. 4 illustrates an example graphical user interface for presenting a project view.

FIG. 4 illustrates an example graphical user interface 400 for presenting a project view. For example, CMS client 242 can present GUI 400 on a display of client device 240 in response to the user selecting project 340 of FIG. 3. GUI 400 can present a view of a project selected by the user. The project view presented by GUI 400 can include various content items and/or other project data associated with project 340 (e.g., "Project Widget") selected by the user from GUI 300, for example.

In some implementations, GUI 400 can include graphical element 402 representing the project presented by GUI 400. For example, graphical element 402 can be a banner presented across the top of GUI 400. Graphical element 402 can include an image or other graphical element representing the project 340. The aesthetic provided by graphical element 402 can provide a means by which a viewing user can distinguish project 340 from other projects. In some implementations, graphical element 402 can be customized according to individual user preferences. For example, the user can change the image presented by graphical element 402 by selecting another image. Thus, graphical element 402 can be different for each member of the project.

In some implementations, graphical element 402 can include graphical element 404 representing the selected project 340. For example, graphical element 404 can have a specific icon or shape (e.g., hexagon) that distinguishes a content item associated with a project from other items that are not associated with projects. Stated differently, the shape of graphical element 404 can allow users to quickly distinguish between content items that are associated with projects and content items that have no project affiliation. For example, a content item associated with a project can be presented with graphical element 404 (e.g., a hexagon), while content items that are not associated with a project may be presented with other corresponding shapes or icons such as a square or rectangular graphical representation. In addition to having a unique shape associated with projects, graphical element 404 may include a visual identifier, such as an image or color, that is specific to project 340. Thus, when a content item associated with project 340 is presented with graphical element 404, the user can quickly identify with which project the content item is associated.

In some implementations, graphical element 402 can include an identifier for the selected project. For example, graphical element 402 can include graphical element 406 that provides a textual representation (e.g., project identifier) of the selected project 340.

In some implementations, graphical element 402 can include graphical element 408 for searching content items managed by content management system 106. For example, the user can provide text input to graphical element 408 to specify search parameters. CMS client 242 can send the search parameters to content management system 106 in a search request. Content management system 106 can return to CMS client 242 search results (e.g., content items, comments, tasks, users, projects, content item collections, etc.) that match the search parameters. CMS client 242 can then present the search results on a search results GUI (not shown).

In some implementations, graphical element 402 can include graphical element 410 for accessing notifications. For example, when a notification is sent to the user or to a project associated with the user, graphical element 410 can indicate that a new notification has been received. The user can select graphical element 410 to cause CMS client 242 to present the notifications on a GUI (not shown).

In some implementations, graphical element 402 can include graphical element 412. For example, graphical element 412 can be a graphical representation (e.g., image, avatar, icon, etc.) of the user who is currently signed in to content management system 106 through CMS client 242.

In some implementations, GUI 400 can include project content area 420. For example, content area 420 can present representations of content items linked to the selected project 340. For example, rather than having project content items stored within a project specific and/or distinct project storage location, project data can include links (e.g., references, uniform resource locators 'URL', etc.) to content items external to the project and/or content management system 106. A user can actuate (e.g., click, right click, control click, tap, hover over, etc.) a link to view the corresponding content items. In some implementations, multiple projects can link to and/or include the same content items. To decrease storage requirements and eliminate the need to replicate changes made to a content item in one project to copies of the content item in other projects, content items stored within content management system 106 may be linked to multiple projects but stored only once within the system. Moreover, using links to associate content with projects allows projects to link with any type of content that is stored anywhere reachable by a network connection (e.g., both internal and external to content management system 106). For example, project 340 can include links to content items (e.g., content item 422), collaborative content items (e.g., collaborative content item 424), content item collections (e.g. folder 426), and/or other projects (e.g., project 428).

Linked content items, such as content item 422, can be stored by content management system 106, e.g., in association with a user account of content management system 106. Linked content items can be any type of content item such as documents, collaborative content items, text, audio, images, videos, webpages, executable files, binary files, placeholder files that reference other content items, or etc. In some implementations, content items can be linked to a project based on a mapping between an identifier of the content item in content management system 106 and an identifier of the project. In some implementations, a content item can be linked to a project by associating the project with a URL to the content item in the content management system 106 or with a network resource storing the content item external to content management system 106. Linked content item collections, such as content item collection 426, can be linked to a project in a similar manner as other content items.

Linked collaborative content items, such as collaborative content item 424, as discussed above, can be files that users can create and edit using a collaborative content items editor, and can contain collaborative content item elements such as a collaborative content item identifier, one or more author identifiers, text, media, collaborative content item attributes, interaction information, comments, sharing users, etc. Collaborative content items can be linked to a project by storing a mapping between the collaborative content item identifier and the project. In some implementations, a project view can be provided in a web interface and selecting a collaborative content item linked to a project can cause the web browser to load a collaborative content item editor to edit the selected collaborative content item.

Project 340 can include other projects, such as project 428. A first project can be included in a second project by storing a mapping between the included project identifier and the project.

In some implementations, CMS client 242 can filter or sort content items in content area 420 according to various criteria. For example, content area 420 can include graphical element 430 for presenting recently updated content items linked to project 340. When the user selects graphical element 430, CMS client 242 can present project content items that have been updated since the user last viewed the selected project 340. Alternatively, when the user selects graphical element 430, CMS client 242 can present project content items that have been updated during a period of time prior to the current time. For example, CMS client 242 can present content items that have been updated during the last 24 hours, 3 days, etc. In some implementations, content items can be organized by last update time when graphical element 430 is selected.

In some implementations, content area 420 can include graphical element 432 for sorting content items alphabetically. For example, in response to receiving a user selection of graphical element 432, CMS client 242 can present content items in alphabetical order by name or identifier.

In some implementations, content area 420 can include graphical element 434 for presenting external content linked to the selected project 340. For example, in response to receiving a user selection of graphical element 434, CMS client 242 can filter content items associated with the selected project so that only links to external content are presented in content area 420.

In some implementations, content area 420 can include graphical element 436 for presenting content items that are shared with the user. For example, in response to receiving a user selection of graphical element 436, CMS client 242 can filter content items associated with the selected project so that only content items that were shared with the user (e.g., content items that another user shared with the user, provided a content item link to the user, or had permissions set for access by the user) are presented in content area 420.

In some implementations, content area 420 can include graphical element 438 for presenting content items that were created by the user. For example, in response to receiving a user selection of graphical element 436, CMS client 242 can filter content items associated with the selected project so that only content items that were created or originated by the user are presented in content area 420.

In some implementations, content area 420 can include graphical element 440 for presenting content items that were archived. For example, content management system 106 may archive content items that have not been accessed for a period of time. Content management system 106 may archive content items in response to user input indicating that a content item should be archived. Archived content items may not be generally accessible, however, in response to receiving a user selection of graphical element 440, CMS client 242 can present archived content items associated with the selected project in content area 420.

Content management system can use other filtering and/or sorting criteria to present content items linked to a project. For example, content management system 106 can filter and/or sort content items presented on GUI 400 based on which content items are currently being accessed, which user is currently accessing a corresponding content item, which content items are only accessible by project members, which content items are accessible to any user, based on the date the content item was added to the project or to content management system 106, whether the content item has been pinned in the project (discussed below), which folder the content item is stored in or associated with, and/or which project members or content management system users have seen or edited the content item.

In some implementations, GUI 400 can include face pile 450. For example, face pile 450 can include graphical elements representing some or all members of the selected project 340. As described above, member representations in face pile 450 can be ordered based on the member's role in project 340 and/or the member's contributions to project 340. The number of users displayed in the face pile 450 can be limited to a threshold number of users from the ordered list of project members.

In some implementations, GUI 400 can include graphical element 452 for adding a new member to the project. For example, if the user is not currently a member of project 340, the user can select graphical element 452 to join the project. In some implementations, project membership can be contingent on project manager approval, in which case, in response to receiving a user selection of graphical element 452, a notification can be sent to the project manager indicating the user would like to join project 340. The project manager can then accept or reject the user's request to join the project. If the project manager approved the request to join or if project manager approval is not necessary, the user can then be added as a project member. If the user is currently a member of project 340, the user can select graphical element 452, which can be displayed with an alternate label such as "invite project members," to invite another user or users to join the project. In some implementations, content management system 106 can recommend users for a project. For example, when the user selects graphical element 452 to invite another user to the project, CMS client 242 can receive a list of suggested users from content management system 106 and present the list of suggested users to the user. The list of suggested users can be generated based on the user's previous interactions with the suggested users. The list of suggested users can be generated based on the user's previous interactions with the same content items as the suggested users or with content items associated with the project.

In some implementations, GUI 400 can include graphical element 460 for creating a new content item for the project. For example, the user can select graphical element 460 to cause content management system 106 to generate a new content item (e.g., collaboration content item, document, spreadsheet, image, etc.) for the project. After creating the new content item, content management system 106 can link the content item to the project. Similarly, GUI 400 can include graphical element 462 for creating a new folder for the project. The user can select graphical element 460 to cause content management system 106 to create a new folder within the project. After creating the new folder, content management system 106 can link the new folder to the project.

In some implementations, GUI 400 can include graphical element 464 for adding a new content item to the project. For example, a user can select graphical element 464 to cause CMS client 242 to present GUI 500 of FIG. 5 to add another project, content item, and/or external content (e.g., URL) to the current project.

As described above, GUI 400 can include, in a single project view, a variety of project items associated with a project. For example, GUI 400 can include representations of one or more project items including any of: synchronization content items (e.g. content items managed by content management system 106 for synchronization with one or more client devices), content items stored externally to content management system 106, collaborative content items (e.g. content items that can be provided by content management system 106 through a web-based collaborative content item editor), other projects, content item collections, tasks (discussed below), member user accounts, or any combination thereof.

Figure 5:
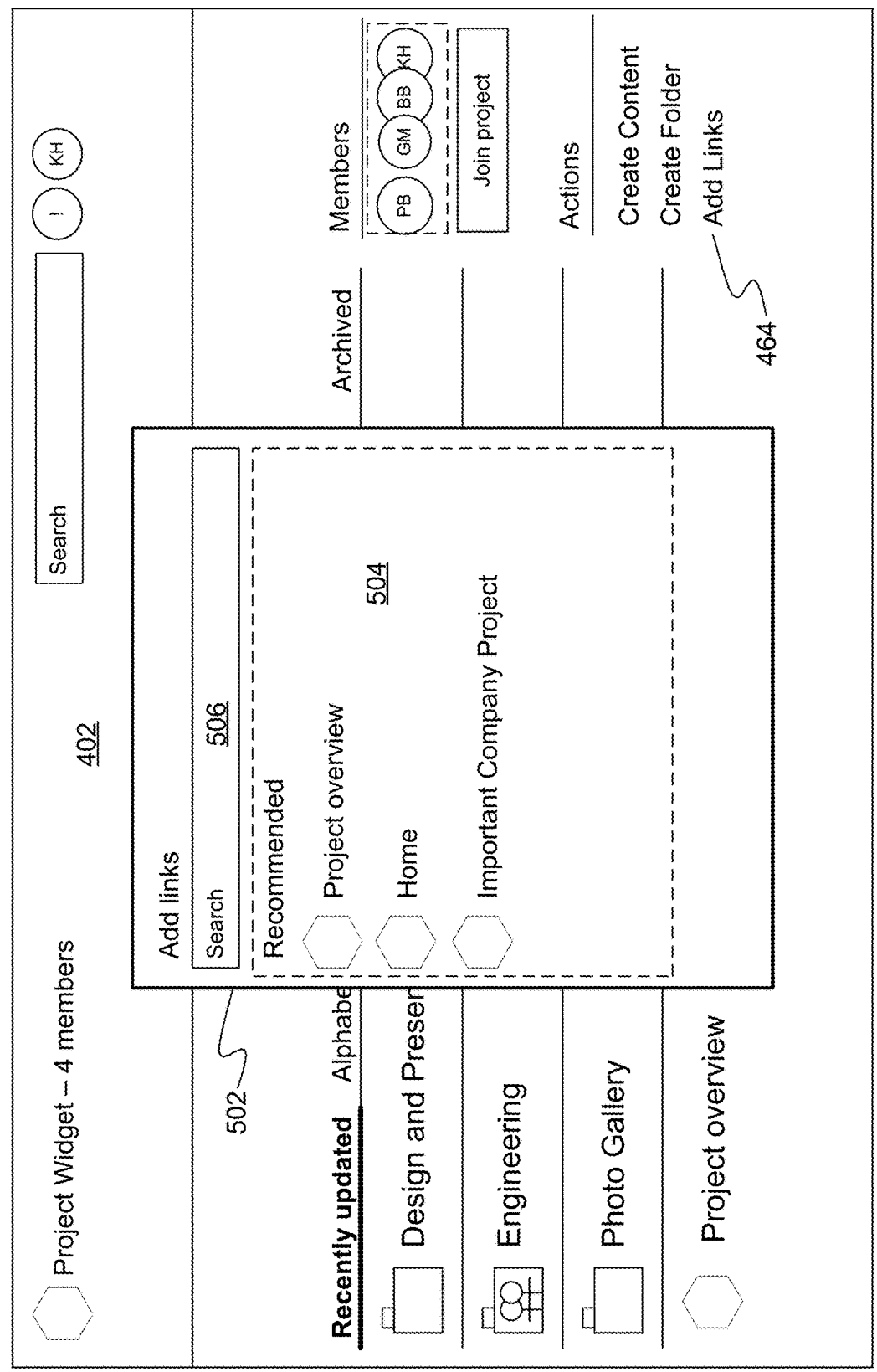
FIG. 5 illustrates an example graphical user interface 500 for adding a link to a project.

FIG. 5 illustrates an example graphical user interface 500 for adding a link to a project. For example, CMS client 242 can present GUI 500 in response to receiving a user selection of graphical element 464 of FIG. 4. GUI 500 can have similar features as GUI 400. However, in response to receiving a selection of graphical element 464, GUI 500 can present graphical element 502 for receiving user input specifying a new content item for project 340.

In some implementations, graphical element 502 can include project suggestions. For example, when graphical element 502 is initially presented by CMS client 242, graphical element 502 can present suggested projects that content management system 106 has determined might be relevant to the user or to project 340. For example, content management system 106 can determine projects to suggest based on natural language processing analysis of content items linked to candidate projects to determine similarities in subject matter (e.g., common keywords, common phrases, etc.) between the currently selected project and a candidate project suggestion. Content management system 106 can determine projects to suggest based on whether the candidate project links to the same or similar content as the currently selected project (e.g., project 340). Content management system 106 can determine projects to suggest based on whether the candidate project has some of the same project members as the currently selected project. Content management system 106 can determine projects to suggest based on whether the candidate project has some members that regularly interact with (e.g., communicate, assign tasks, send comments, share calendar events, etc.) and/or share content items with members of the currently selected project. Generally, content management system 106 can determine whether there is some overlap in people (e.g., members), content, and/or subject matter between the currently selected project and a candidate project suggestion. If an overlap exists, then content management system 106 can provide the candidate project suggestion as a project suggestion to CMS client 242 and CMS client 242 can present the project suggestion to the user on graphical element 502. The user can select a project suggestion to add or link the suggested project to the current project 340.

In some implementations, graphical element 502 can include graphical element 506 for receiving search parameter input from the user. For example, graphical element 506 can be a text input box for specifying search parameters (e.g., search strings) for performing a search of content items in the currently selected project and/or throughout content management system 106. For example, the user can select graphical element 506 and then use a keyboard or voice input to specify one or more search parameters. For example, the search parameters can include strings that identify content items, projects, users, etc. The search parameters can include uniform resource locators (URL) that identify network resources internal or external to content management system 106. CMS client 242 can send the search parameters to content management system 106 and content management system 106 can return search results (e.g., metadata) describing content items, projects, users, etc., that match the specified search parameters. CMS client 242 can then present the search results on graphical element 502. The user can select one or more of the search results to link the corresponding project, content item, user, etc., to the current project.

Figure 6A:
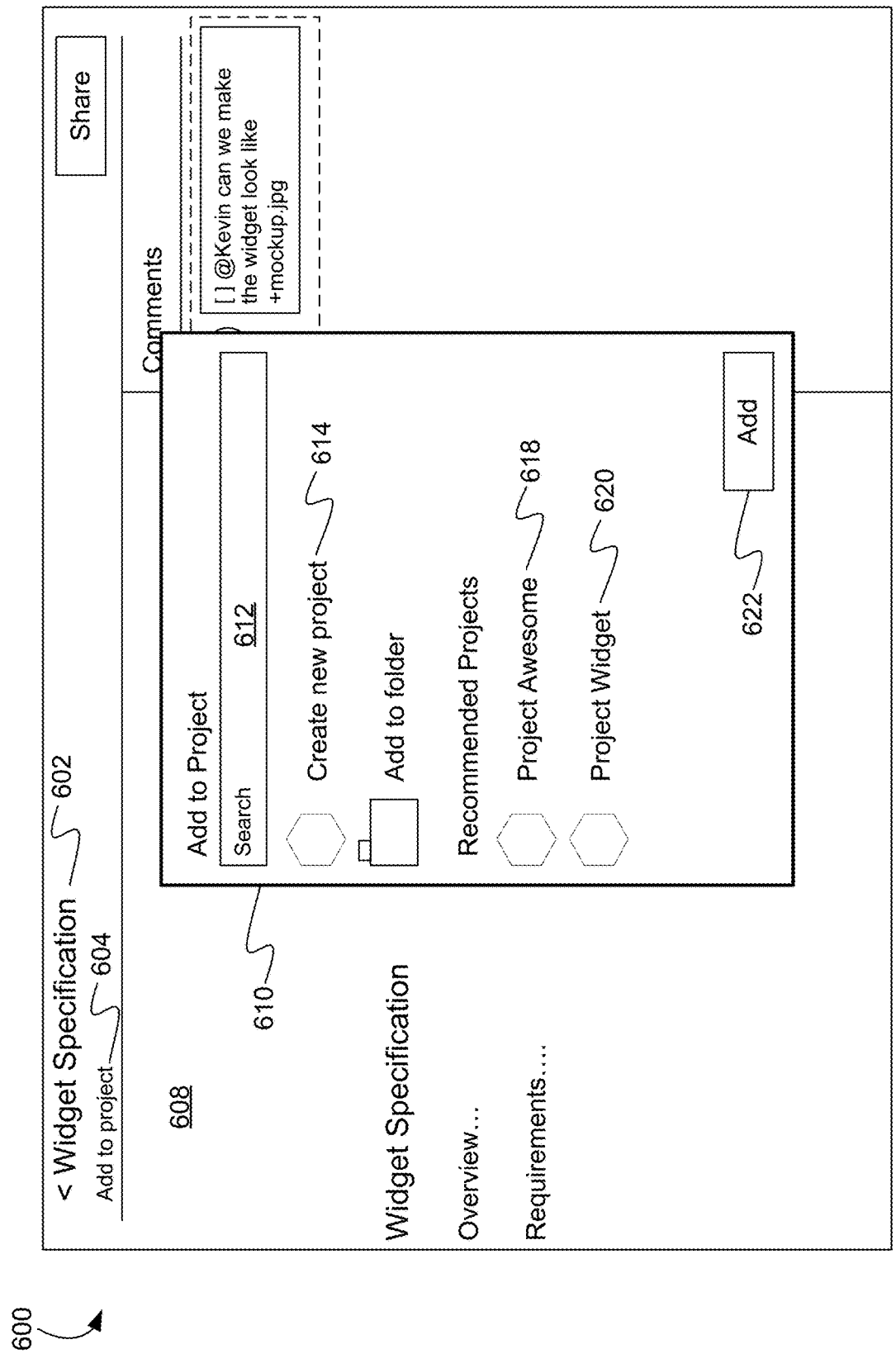
FIG. 6A illustrates an example graphical user interface 600 for adding a content item to a project.

FIG. 6A illustrates an example graphical user interface 600 for adding a particular content item to a project. For example, GUI 600 can be presented by CMS client 242 on a display of client device 240.

In some implementations, CMS client 242 can present a content item on GUI 600. The content item may or may not already be associated with a project. GUI 600 can include graphical element 602 identifying the content item and may present area 608 showing contents of the content item.

In some implementations, GUI 600 can include graphical element 604 for adding the content item to a project. For example, while presenting the content item, CMS client 242 can receive user input selecting graphical element 604. In response to receiving the user selection of graphical element 604, CMS client 242 can present graphical element 610 (e.g., a window, popup, overlay, etc.) presenting options for adding the content item to a project.

In some implementations, graphical element 610 can include recommended projects 618 and/or 620. For example, content management system 106 can determine projects to suggest based on natural language processing analysis of content items linked to candidate projects to determine similarities in subject matter (e.g., common keywords, common phrases, etc.) between the currently presented content item and a candidate project suggestion. Content management system 106 can determine projects to suggest based on whether the candidate project links to the same or similar content as the currently presented content item. Content management system 106 can determine projects to suggest based on whether the candidate project has project members that have edited, viewed, commented on, or otherwise interacted with the currently presented content item. Generally, content management system 106 can determine whether there is some overlap in people (e.g., members), content, and/or subject matter between the currently presented content item and a candidate project suggestion. If an overlap exists, then content management system 106 can provide the candidate project suggestion as a project suggestion to CMS client 242 and CMS client 242 can present the project suggestion to the user on graphical element 610. The user can select a project suggestion to add or link the currently presented content item to the selected suggested project.

In some implementations, graphical element 610 can include graphical element 612 for searching for projects managed by content management system 106. For example, graphical element 612 can be a text input box for specifying search parameters (e.g., search strings) for performing a search for projects managed by content management system 106. For example, the user can select graphical element 612 and then use a keyboard or voice input to specify one or more search parameters. CMS client 242 can send the search parameters to content management system 106 and content management system 106 can return search results (e.g., metadata) describing projects, that match the specified search parameters. CMS client 242 can then present the search results on graphical element 610. The user can select one or more of the search results to add the currently presented content item to the corresponding project.

In some implementations, graphical element 610 can include graphical element 614 to create a new project. For example, in response to receiving user input selecting graphical element 614, CMS client 242 can present GUI 650 of FIG. 6B.

Figure 6B:
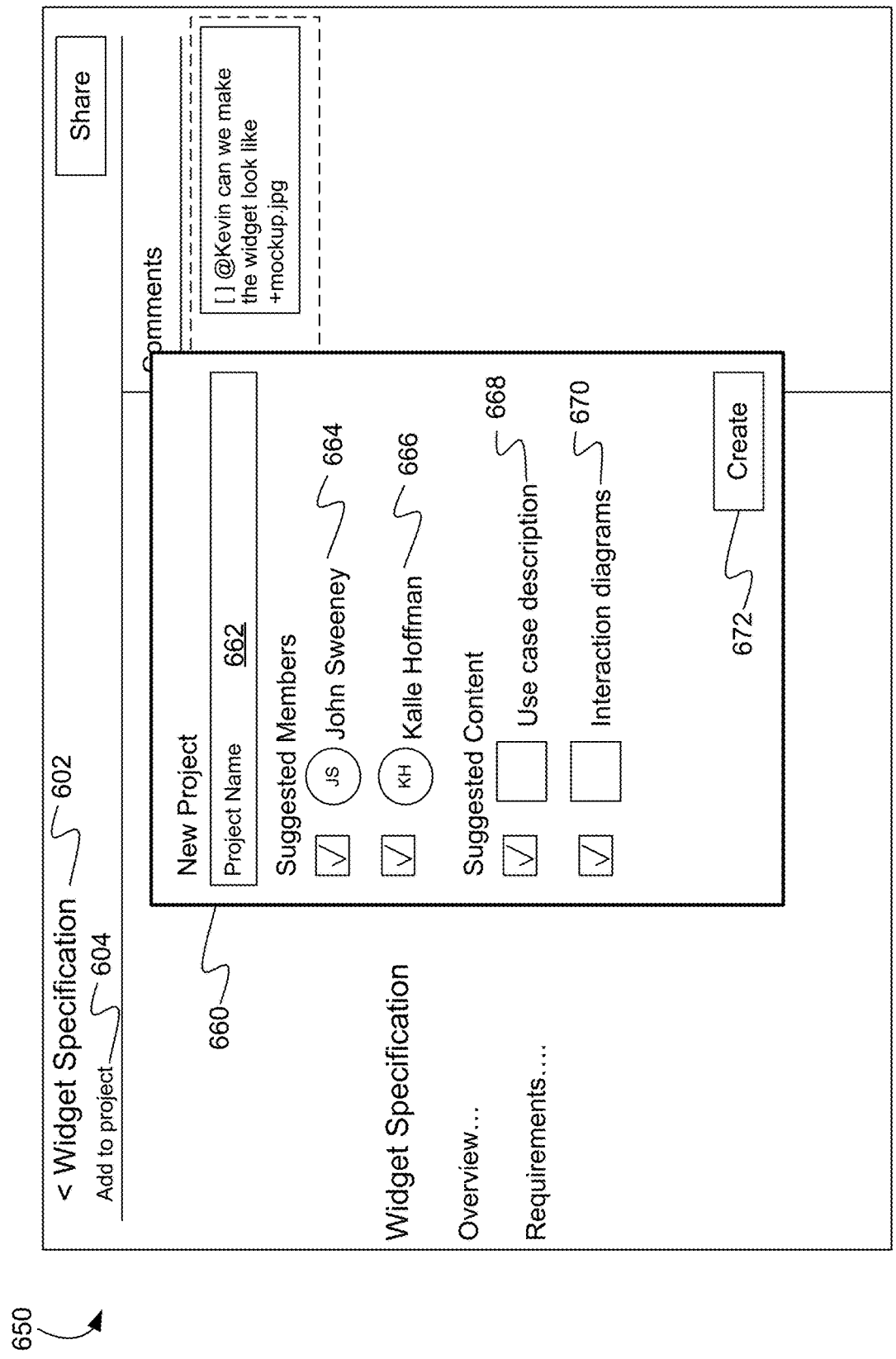
FIG. 6B illustrates an example graphical user interface for creating a new project.

FIG. 6B illustrates an example graphical user interface 650 for creating a new project. For example, GUI 650 can be similar to GUI 600. However, at this point the user has selected graphical element 614 to create a new project and, in response to receiving the selection of graphical element 614, CMS client 242 has presented graphical element 660 for configuring a new project. Alternatively, CMS client 242 can present graphical element 660 for configuring a new project upon user selection of graphical element 314.

In some implementations, graphical element 660 can include graphical element 662 for specifying an identifier for a new project. For example, graphical element 662 can be a text input control. The user can select graphical element 662 and provide text input to specify the name or identifier for the new project.

In some implementations, graphical element 660 can present suggested members for the new project. For example, when graphical element 660 is presented by CMS client 242, graphical element 660 can present suggestions for members for the new project that content management system 106 has determined might be relevant to the user, the new project, or the currently presented content item. For example, content management system 106 can determine members to suggest based on natural language processing analysis of content items associated with candidate suggested members to determine similarities in subject matter (e.g., common keywords, common phrases, etc.) between what the candidate suggested members are working on and the content of the currently presented content item. Content management system 106 can determine candidate members to suggest based on natural language processing analysis of the project name 662 and content items associated with candidate suggested members (e.g., common keywords, common phrases, etc.) to determine similarities in subject matter. Content management system 106 can determine candidate members to suggest based on whether the candidate member belongs to some of the same projects as the user or has worked on the same content items as the user. Content management system 106 can determine candidate members to suggest based on whether the candidate member regularly interacts (e.g., communicates, assigns tasks, sends comments, shares calendar events, etc.) with the user or interacts with the currently presented content item (e.g., the content item is shared with candidate members). Generally, content management system 106 can determine whether there is some overlap between (A) the currently presented content item, the user, and/or the new project, and (B) the candidate suggested members. If a threshold amount of overlap exists, then content management system 106 can provide the candidate member suggestion as a member suggestion to CMS client 242 and CMS client 242 can present the member suggestion to the user on graphical element 660. The user can select a member suggestion (e.g., member suggestion 664, member suggestion 666, etc.) to add or remove the candidate member from the new project. In some implementations, graphical element 660 can present representations of other (non-suggested) users that the user can select to add these users to the new project. For example, these non-suggested users can be presented in response to a user entering a search string and the non-suggested users matching the entered search string.

In some implementations, graphical element 660 can present suggested content items for the new project. For example, when graphical element 660 is presented by CMS client 242, graphical element 660 can present suggestions for content items to include in the new project that content management system 106 has determined might be relevant to the user, the new project, or the currently presented content item. For example, content management system 106 can determine candidate content items to suggest based on natural language processing analysis of the candidate content items to determine similarities in subject matter (e.g., common keywords, common phrases, etc.) between the candidate content items and the content of the currently presented content item. Content management system 106 can determine candidate content items to suggest based on natural language processing analysis of the project name 662 and content of the candidate content items (e.g., common keywords, common phrases, etc.) to determine similarities in subject matter. Content management system 106 can determine candidate content items to suggest based on whether the candidate content items are associated with or linked to some of the same projects as the user. Content management system 106 can determine candidate content items to suggest based on whether the user regularly interacts (e.g., opens, edits, shares, etc.) with the candidate content items. Generally, content management system 106 can determine whether there is some overlap between (A) the currently presented content item, the user, and/or the new project, and (B) the candidate content items. If a threshold amount of overlap exists, then content management system 106 can provide the candidate content items suggestions as a content item suggestion to CMS client 242 and CMS client 242 can present the content item suggestion to the user on graphical element 660. The user can select a content item suggestion (e.g., content item suggestion 668, content item suggestion 670, etc.) to add or remove the candidate content item from the new project.

In some implementations, content item suggestions and/or member suggestions can be selected for a project by default. For example, when CMS client 242 presents graphical element 660, each of the suggested items (e.g., suggested members, suggested content items, etc.) can be pre-selected for inclusion in the new project. Thus, if the user agrees with the suggestions, the user can simply select graphical element 672 to create a new project that includes the suggested items. If the user does not agree with some of the suggestions, the user can deselect suggested items so that they are not included in the project and then select graphical element 672 to create a new project that includes any remaining selected suggested items. When the user provides input to create the new project, content management system 106 can create a new project that includes any selected suggested items and the currently presented content item (e.g., "Widget Specification" 602).

FIG. 7 illustrates an example graphical user interface 700 for presenting suggested content for a project. For example, GUI 700 can correspond to GUI 400 described above. GUI 700 can be presented by CMS client 242 on a display of client device 240 in response to the user selecting a project (e.g., project 340) from GUI 300.

In some implementations, GUI 700 can include content suggestion area 702. For example, when a user selects project 340 from GUI 300, CMS client 242 can present GUI 700 that includes project data associated with the selected project received from content management system 106. In some implementations, CMS client 242 can receive project data that includes suggested content for the currently selected project 340. For example, content management system 106 can analyze content managed by content management system 106 to determine which content items not already associated with or added to the currently selected project might be relevant to the currently selected project. Content management system 106 can then send the relevant content items, or metadata describing the relevant content items, to CMS client 242 to present on GUI 700 as suggested content.

In some implementations, content management system 106 can determine suggested content for the currently selected project. For example, content management system 106 can determine content items to suggest based on natural language processing analysis of candidate content items to determine similarities in subject matter (e.g., common keywords, common phrases, etc.) between (A) the candidate content items and (B) the name or description of the project and/or the content already associated with the currently selected project. Content management system 106 can determine candidate content items to suggest based on whether the candidate content items are associated with or linked to some of the same projects as members of the currently selected project. Content management system 106 can determine candidate content items to suggest based on whether the members of the currently selected project regularly interact (e.g., recently edited, recently viewed, comment on, shared, etc.) with the candidate content items. Generally, content management system 106 can determine whether there is some overlap between the currently selected project, the user, and/or the candidate content items. If a threshold amount of overlap exists, then content management system 106 can provide the candidate content items as a content item suggestion to CMS client 242 and CMS client 242 can present the content item suggestion to the user on graphical element 660. The user can select graphical element 706 corresponding to content item suggestion 704 to add the suggested content item to the currently selected project represented on GUI 700.

In some implementations, content management system 106 can adjust the permissions associated with a content item when a content item is added to a project. In some implementations, to add a content item to a project, as described above, the user adding the content item to the project must have write permissions with respect to the content item. In some implementations, to add a content item to a project, the user must also be a member of the project. When the content item is added to the project, content management system 106 can grant all members of the project access to the content item. For example, content management system 106 can grant read-only permissions or read-write permissions with respect to the content item to members of the project to which the content item was added.

Figure 8:
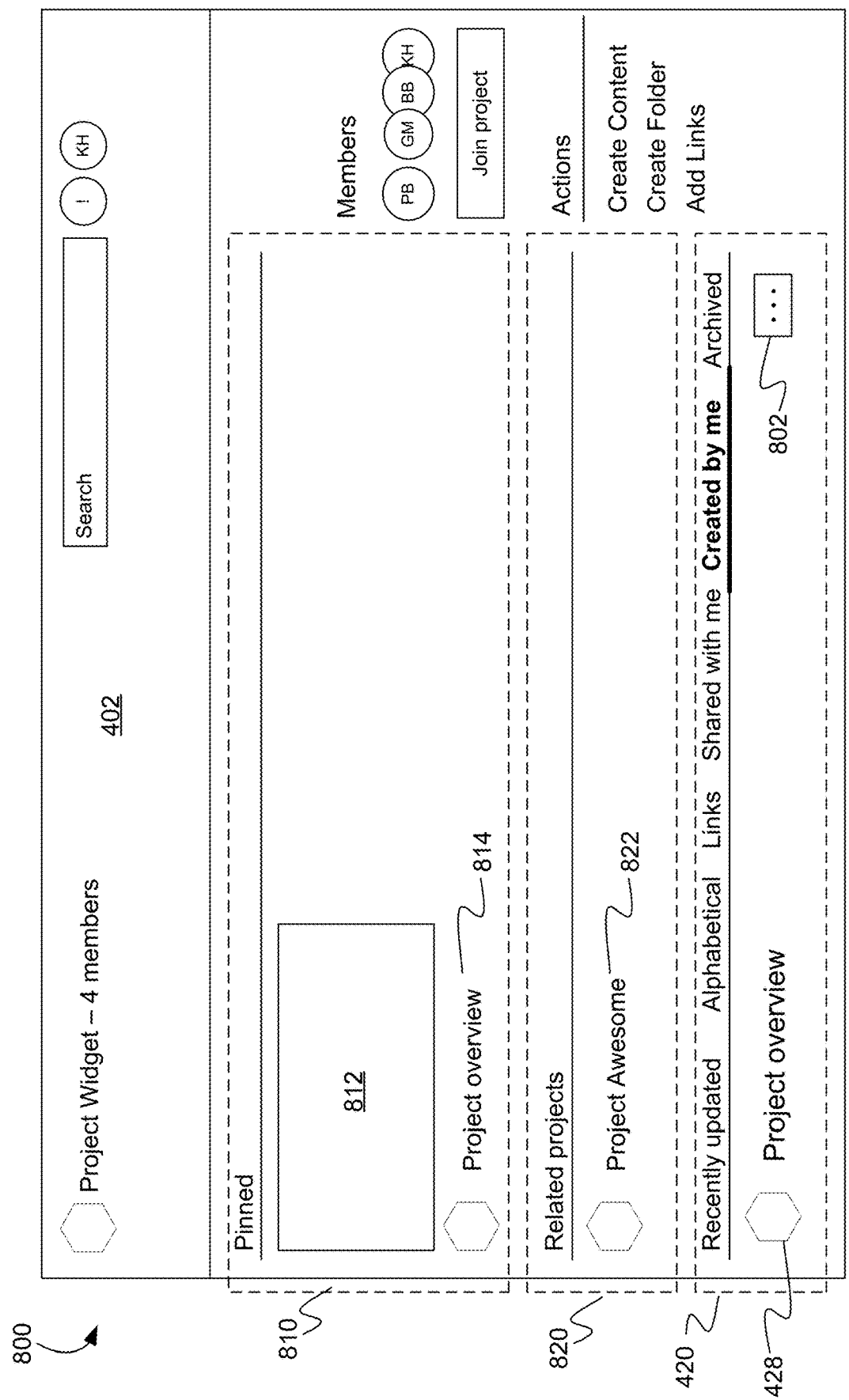
FIG. 8 illustrates an example graphical user interface for presenting pinned content and/or related projects.

FIG. 8 illustrates an example graphical user interface 800 for presenting pinned content items and/or related projects. For example, GUI 800 can correspond to GUI 400 of FIG. 4. GUI 800 can be presented in response to a user selecting a project from GUI 300 of FIG. 3.

In some implementations, GUI 800 can include pinned content area 810. For example, a user can select graphical element 802 corresponding to content item 428 to designate content item 428 as a pinned content item within the selected project. For example, the user can select graphical element 802 to cause content management system 106 to present a menu that allows the user to designate the corresponding project as a pinned project. Content management system 106 can store metadata for linked content indicating whether a content item has been pinned within the project. Pinned content items can be presented on pinned content area 810 below banner 402 so that users and/or project members can quickly access the pinned content. For example, pinned content can include project content items that project members consider to be important content items for the project.

In some implementations, pinned content area 810 can include graphical element 812 and/or graphical element 814 representing a pinned content item for the project. For example, graphical element 812 can be a preview image of the pinned content item. Graphical element 814 can be text and/or icons identifying the pinned content item. The user can select graphical element 812 and/or graphical element 814 to cause CMS client 242 to present the corresponding content item on a display of client device 240.

In some implementations, GUI 800 can include related projects area 820. For example, related projects area 820 can include representations of projects that are related to the currently selected project, members of the currently selected project, and/or content items linked to the currently selected project. For example, when GUI 800 is presented by CMS client 242, related projects area 820 can present suggested projects that content management system 106 has determined might be relevant to the user and/or relevant to the current project. For example, content management system 106 can determine projects to suggest based on natural language processing analysis of content items linked to candidate projects to determine similarities in subject matter (e.g., common keywords, common phrases, etc.) between the title, descriptions, or linked content items of the currently selected project and a candidate project suggestion. Content management system 106 can determine projects to suggest based on whether the candidate project links to the same or similar content as the currently selected project (e.g., project 340). Content management system 106 can determine projects to suggest based on whether the candidate project has some of the same project members as the currently selected project. Content management system 106 can determine projects to suggest based on whether the candidate project has some members that regularly interact with (e.g., communicate, assign tasks, send comments, share calendar events, etc.) and/or share content items with members of the currently selected project. Generally, content management system 106 can determine whether there is some overlap in people (e.g., members), content, and/or subject matter between the currently selected project and a candidate project suggestion. If a threshold amount of overlap exists, then content management system 106 can provide the candidate project suggestion as a project suggestion to CMS client 242 and CMS client 242 can present the project suggestion to the user in related projects area 820 of GUI 800. The user can select a project suggestion to add or link the suggested project to the current project 340.

Figure 9:
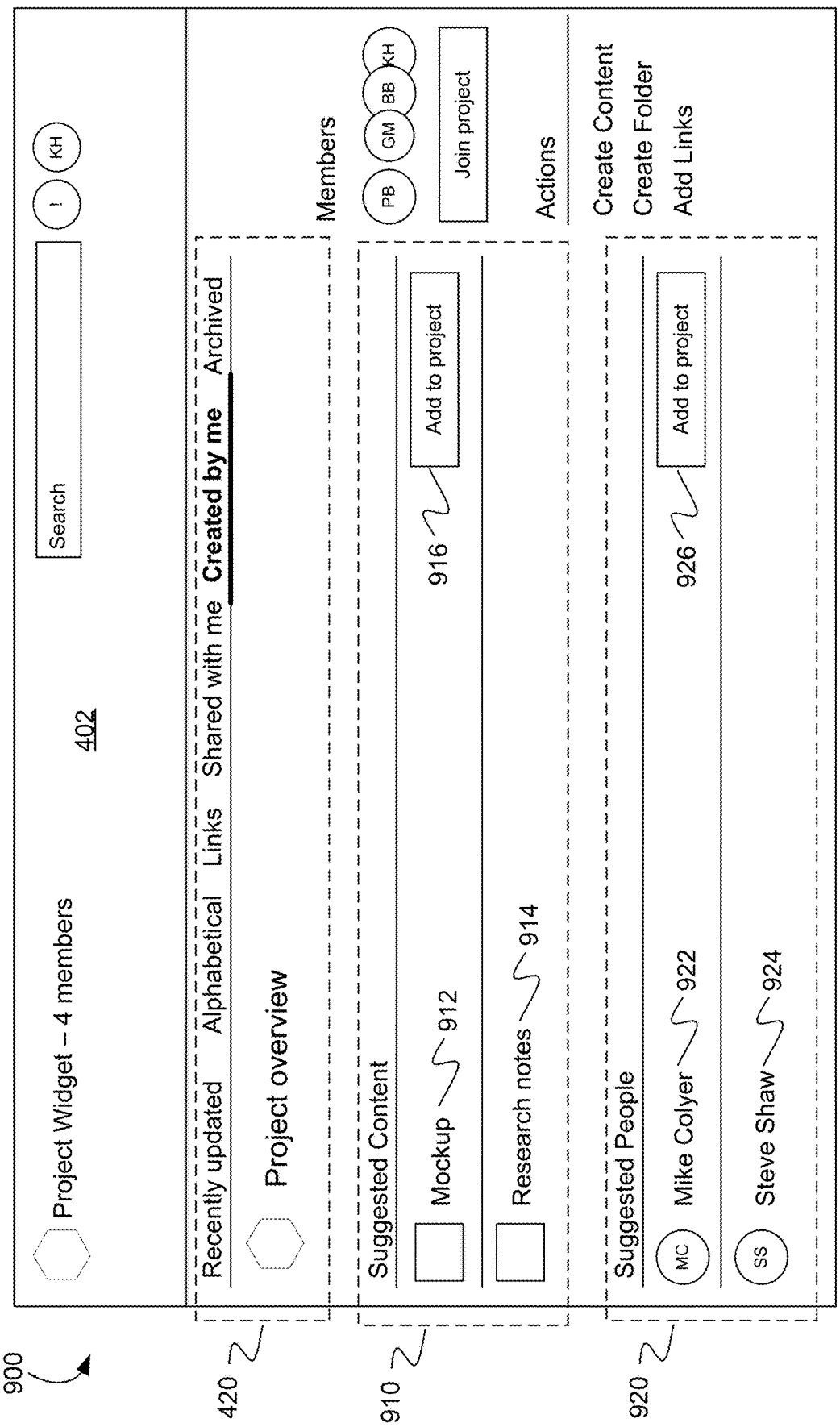
FIG. 9 illustrates an example graphical user interface for suggesting content items and/or project members for a selected project.

FIG. 9 illustrates an example graphical user interface 900 for suggesting content items and/or project members for a selected project. For example, GUI 900 can correspond to GUI 400 of FIG. 4. In some implementations, CMS client 242 can receive from content management system 106 content item suggestions and/or project member suggestions for the selected project 340. CMS client 242 can then present the content item suggestions and/or project member suggestions on GUI 900.

In some implementations, GUI 900 can include suggested content area 910. For example, content management system 106 can determine content items to suggest based on natural language processing analysis of candidate content items to determine similarities in subject matter (e.g., common keywords, common phrases, etc.) between the candidate content items and the content already associated with the currently selected project and/or the title and/or description of the selected project. Content management system 106 can determine candidate content items to suggest based on whether the candidate content items are associated with or linked to some of the same projects as members of the currently selected project. Content management system 106 can determine candidate content items to suggest based on whether the members of the currently selected project regularly interact (e.g., recently edited, recently viewed, comment on, shared, etc.) with the candidate content items. Generally, content management system 106 can determine whether there is some overlap between the currently selected project, the user, and/or the candidate content items. If an overlap exists, then content management system 106 can provide the candidate content items as a content item suggestion to CMS client 242 and CMS client 242 can present the content item suggestion to the user in suggested content area 910 of GUI 900. The user can select graphical element 916 corresponding to content item suggestion 912 to add suggested content item 912 to the currently selected project represented on GUI 900.

In some implementations, GUI 900 can include suggested people area 920. For example, when GUI 900 is presented by CMS client 242, GUI 900 can present membership suggestions for the currently selected project that content management system 106 has determined might be relevant to the user or the currently selected project. For example, content management system 106 can determine individual members, groups of members, and/or teams of members to suggest based on natural language processing analysis of content items associated with the currently selected project to determine similarities in subject matter (e.g., common keywords, common phrases, etc.) between content items the candidate suggested members are working on, have recently worked on, created, etc., and the content items the currently selected project and/or the title and/or description of the currently selected project. Content management system 106 can determine candidate members to suggest based on whether the candidate member belongs to some of the same projects as other project members or has worked on the same content items as other project members. Content management system 106 can determine candidate members to suggest based on whether the candidate member regularly interacts (e.g., communicates, assigns tasks, sends comments, shares calendar events, etc.) with the user or other members of the currently selected project. Generally, content management system 106 can determine whether there is some overlap between (A) the currently selected project and/or the user and (B) the candidate suggested members. If a threshold amount of overlap exists, then content management system 106 can provide the candidate member suggestion as a member suggestion to CMS client 242 and CMS client 242 can present the member suggestion to the user in suggested people area 920 on GUI 900. The user can select graphical element 926 to add the corresponding suggested member to the currently selected project.

Figure 10:
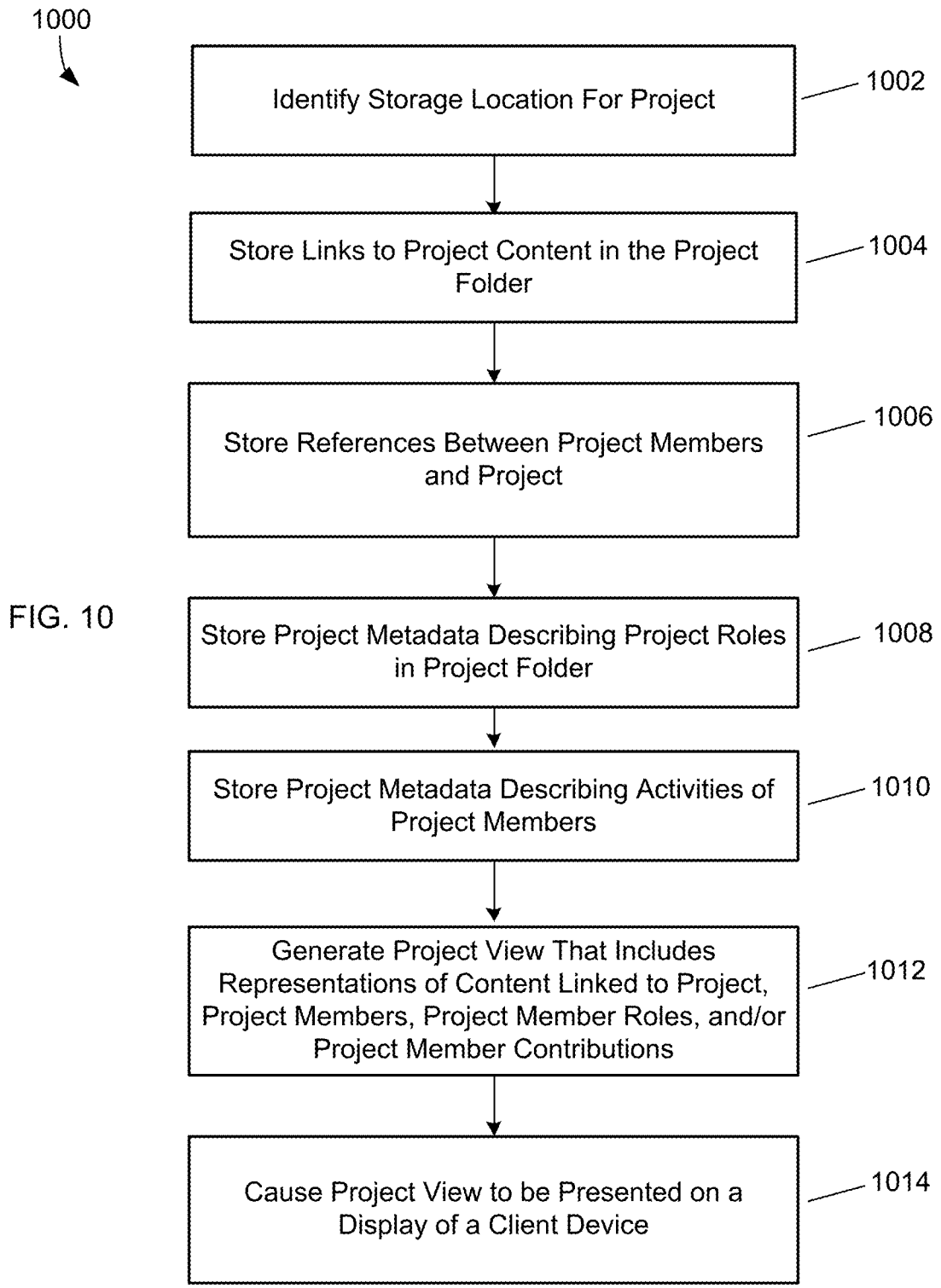
FIG. 10 is a flow diagram of an example process 1000 for managing a project using links to project content.

FIG. 10 is a flow diagram of an example process 1000 for managing a project using links to project content. For example, content management system 106 can manage projects for teams of users (e.g., project members). The project data can be stored in a project database that maps project data to a project identifier for the project. In some implementations, project content items (e.g., files, documents, collaborative content item, images, notes, etc.) can be associated with the project using links to the project content items. For example, the content items can be stored separately (e.g., in a different storage location) than the project data 204. To associate content items with a project, links (e.g., a content item, file, database entry, etc., that references another content item, file, etc.) that reference the project content items can be stored, e.g. in a database or project folder. Thus, content management system 106 does not have to replicate content items when the same content item is associated with multiple different projects.

At step 1002, content management system 106 can identify a storage location for project data corresponding to a project. In some implementations, the storage location can be one or more databases or other metadata storage or can be a particular project folder. In some implementations, the project data can be a mapping of a project identifier for the project to content items, links, references, membership data, and/or other project data managed by content management system 106. The project data can be shared with members of the project such that the project members can access, modify, share, and otherwise view or manipulate content items and/or other attributes associated with the project and/or project folder.

At step 1004, content management system 106 can store references between the project content and the project in the identified storage location. For example, when a project member adds a content item to the project, as described above, the content item can be associated with the project using a reference to the content item. For example, a link (e.g., a content item, file, etc., that references another content item, file, etc.) that references the content item can be stored in the project folder. As another example, a database entry can be created joining an ID of the content item with an ID of the project. Because the content item can be stored separately from the content item reference and because the reference merely refers to the content item, the reference can be moved, deleted, etc., without affecting the corresponding content item. However, the members of the project can use the reference to access and modify the referenced content item using the appropriate editor.

At step 1006, content management system 106 can store references between the project members and the project in the identified storage location. For example, content management system 106 can store information indicating which users of content management system 106 are members of the project.

At step 1008, content management system 106 can store project metadata describing project roles in the project data. For example, project members and/or content management system 106 can define various project roles for the project and assign the project roles to members of the project. The role assignments can be stored in the project data.

At step 1010, content management system 106 can store project metadata describing activities of project members. For example, content management system 106 can monitor the behavior and/or activities of project members and/or other users of content management system 106. Content management system 106 can record or store information describing the users' activities within content management system 106. For example, content management system 106 can store information describing interactions (e.g., messaging, mentioning, sharing, collaborating on a content item, etc.) between users, which content items a user views and/or edits, which projects a user has viewed or is a member, and/or which groups or teams a user is a member.

At step 1012, content management system 106 can generate a project view that includes representations of content linked to a project, project members, project member roles and/or project member contributions. For example, content management system 106 can generate a project view (e.g., graphical user interface 400, 500, 700, 800, 900, etc.) that presents representations of content items linked to the project. Content management system 106 can generate a project view (e.g., graphical user interface 400, 500, 700, 800, 900, etc.) that presents representations of project members (e.g., face pile). Content management system 106 can generate a project view (e.g., graphical user interface 400, 500, 700, 800, 900, etc.) that presents representations of project member roles and/or contributions to the project (e.g., order in face pile).

When generating a project view, content management system 106 can generate links for project items, which can be any of: synchronization content items (e.g. content items managed by content management system 106 for synchronization with one or more client devices), content items stored externally to content management system 106 but that are accessible through a network addresses, collaborative content items (e.g. content items that can be provided by content management system 106 through a web-based collaborative content item editor), other projects, content item collections, tasks member user accounts, or any combination thereof. Links to project items can be associated with the project, e.g. by virtue of the data stored in blocks 1004-1010. The generated links can be configured to have different actions when activated depending on project item type.

Links to collaborative content items can be configured to open the collaborative content item, e.g. in a collaborative content item editor. Links to collaborative content items can also be alternatively selected (e.g. through a context menu) that provide other functions related to the collaborative content item such as moving it, deleting it, pinning it, sharing it, etc.

Links to synchronization content items synchronized with or managed by the content management system 106 can be configured to open a web view of the content item; download the content item; or, if the content item is downloaded or is already stored locally on the client, can cause the content item to be opened by an associated program or to be displayed in a folder, in the file system on the client device, that contains the content item.

Links to content items accessible through third-party network addresses can be configured to open the content item using the third-party network addresses, such as in a web browser or another application configured to use the network address.

Links to projects or other content item collections managed by the content management system 106 can be configured to open a project view or web view of the content item collection, download the content item collection; or, if the content item collection is downloaded or is already stored locally on the client, can cause the content item collection to be opened, e.g. by the file system on the client device.

Links to user accounts can be configured to enter the user name in a search area of the project view or open a user details page for the user. A user details page can include general user information or can include information about the user in relation to the current project, e.g. the user's role, content items the user has added to the project, content items of the project the user has opened or edited, etc.

The generated project view can also include elements indicating actions relating to the project or project items. For example, these elements can include how project items have been shared (e.g., which project members and/or other users, or a numerical count of users with access to the content item), project level discussions or comments, and/or tasks or a task list that have been created for the project or in content items linked to the project.

At step 1014, content management system 106 can cause the project view to be presented on display of a client device. For example, the project view can be a web page, web GUI, etc., that can be presented by CMS client 242 when CMS client 242 is a web browser running on the client device. Content management system 106 can serve the project view to CMS client 242 to cause CMS client 242 to present the project view on a display of the client device. Alternatively, content management system 106 can send data for creating a project view to the client device when CMS client 242 is a native client. CMS client 242 can then present a native GUI that presents the project view data.

Figure 11A:
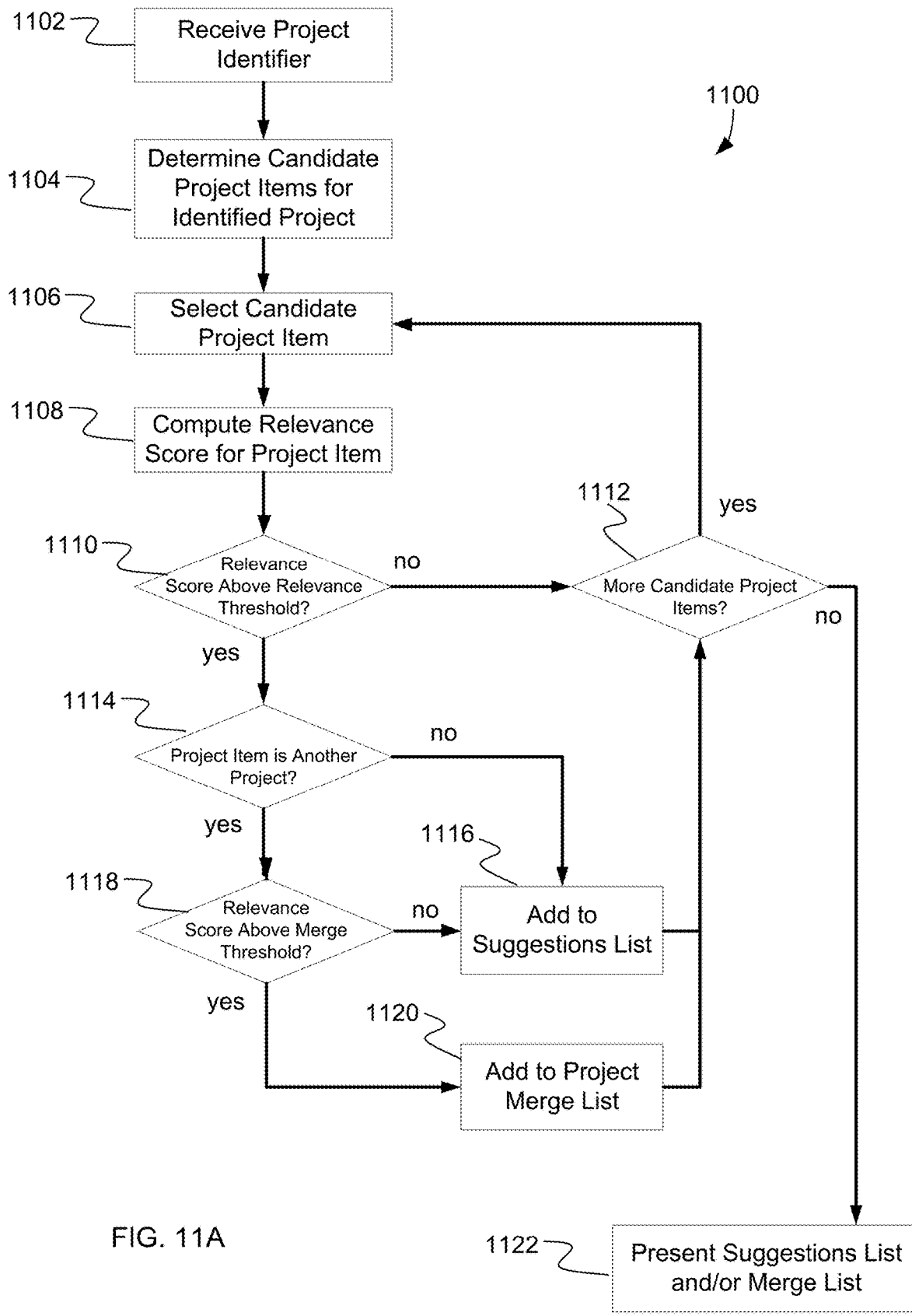
FIG. 11A is a flow diagram of an example process 1100 for generating membership, content, and/or associated project suggestions for a selected project.

FIG. 11A is a flow diagram of an example process 1100 for generating membership, content, and/or associated project suggestions for a selected project. For example, content management system 106 can determine associations between users, content items, and/or projects and make recommendations or suggestions with respect to linking content items, users, and/or projects to the selected project.

At step 1102, content management system 106 can receive a project identifier. For example, the user of client device 240 can interact with CMS client 242 to select a project to view on a GUI of CMS client 242. In some implementations, the user can provide input to CMS client 242 to create a new project. CMS client 242 can send information describing the selected project to content management system 106. For example, CMS client 242 can send a project identifier to content management system 106. In some implementations, all or part of process 1100 can be initiated by an automated process, such as a process to identify suggestions for existing project while a server's load is low. In these implementations, process 1100 may not be initiated by user action. In these implementations, project identifiers can be identified in a variety of ways such as by iterating through the existing project identifiers, selecting high-priority projects, or selecting projects that have not had suggestions determined in a threshold amount of time.

At step 1104, content management system 106 can determine candidate project items for the identified project. For example, the candidate project items can include all project items (e.g., user accounts, content items, tasks, etc.) managed by content management system 106. The candidate project items can include content items for which the current user has permissions. For example, the user may need permissions to access a candidate project item to add it to a project, thus only project items for which a current user has sufficient permissions can be analyzed to suggest to the user. The candidate project items can include content items which the current user has created. The candidate project items can include content items which the current user has opened, edited, or commented on, or performed one of these actions on within a threshold period of time. The candidate project items can include content items stored in particular locations or owned by certain users. Candidate project items that are other projects can be determined based on project relevance, as determined by process 1130 described below. The candidate project items can be included in a collection of candidate project items that can be analyzed for relevance to the identified project, as described further below.

At step 1106, content management system 106 can select a candidate project item from the candidate project items. For example, content management system 106 can select a candidate project item from the collection of candidate project items to determine whether the selected candidate project item is relevant to the identified project. Content management system 106 can iterate through the candidate project items in the collection to determine whether each candidate project item is relevant to the identified project. When a candidate project item is selected from the candidate project items collection, the selected candidate project item can be removed from the collection. Alternatively, content management system 106 can maintain a counter identifying a location in the collection corresponding to the current iteration.

At step 1108, content management system 106 can compute a relevance score for the selected candidate project item. For example, content management system 106 can determine a relevance score representing how relevant the candidate project item is to the identified project. The relevance score can be determined by process 1160 described below. In some implementations, computing the relevance score can include logging reasons for the resulting relevance score, such as project membership or content item editing/viewing overlap, content item overlap, subject matter overlap, or other factors described in relation to process 1160.

At step 1110, content management system 106 can determine whether the relevance score for the selected candidate project item is above a relevance threshold value. If the relevance score for the selected candidate project item is not above the relevance threshold, then process 1100 can proceed to step 1112. If the relevance score for the selected candidate project item is above the relevance threshold, then process 1100 can proceed to step 1114.

At step 1112, content management system 106 can determine whether the candidate project item collection includes more candidate project items that have not been analyzed. If the candidate project item collection includes more candidate project items, then content management system 106 can continue process 1100 at step 1106. If the candidate project item collection does not include more candidate project items to analyze, then content management system 106 can continue process 1100 at step 1122.

At step 1114, content management system 106 can determine whether the selected candidate project item is another project. If the candidate project item is another project, content management system 106 can continue process 1100 at step 1118. If the candidate project item is not another project, content management system 106 can continue process 1100 at step 1116. Process 1100 can make this distinction because, for non-projects, process 1100 is only making a determination for whether it should suggest the candidate project item to add to the identified project. For other projects, process 1100 can make the further determination for whether it should suggest the candidate project to merge with the identified project.

At step 1116, content management system 106 can add the selected candidate project item to a project item suggestions list. For example, the project item suggestion list can include user accounts, content items, tasks, projects, and/or other items that a user may wish to add to the identified project. After adding the selected candidate project item to the project item suggestions list, content management system 106 can continue process 1100 at step 1112.

At step 1118, content management system 106 can determine whether the relevance score for the selected candidate project item is above a merge threshold. For example, when the candidate project item is another project, content management system 106 can determine whether the relevance score for the other project is so high that the identified project and the other project should be merged into the same project. When the relevance score for the other project is not above the merge threshold, content management system 106 can continue process 1100 at step 1116. When the relevance score for the other project is above the merge threshold, content management system 106 can continue process 1100 at step 1120.

At step 1120, content management system 106 can add the candidate project item to a project merge list. For example, when the relevance score for the other project is above the merge threshold, content management system 106 can add the other project to a project merge list so that content management system 106 can suggest that the projects in the merge list with the identified project. After adding the selected candidate project item (e.g., the other project) to the merge list, content management system 106 can continue process 1100 at step 1112.

At step 1122, content management system 106 can present the suggestions list and/or merge list. For example, content management system 106 can generate a project view for the identified project that includes the project items included in the suggestions list and/or merge list. In some implementations, suggestions provided in the suggestions list or merge list can include the corresponding reasons for the suggestion, e.g., the reasons for the corresponding relevance score discussed above. In some implementations, projects on the merge list can be selected for either merging with the identified project or for linking to the identified project. Content management system 106 can send the project view to CMS client 242 for presentation on a display of client device 240.

Figure 11B:
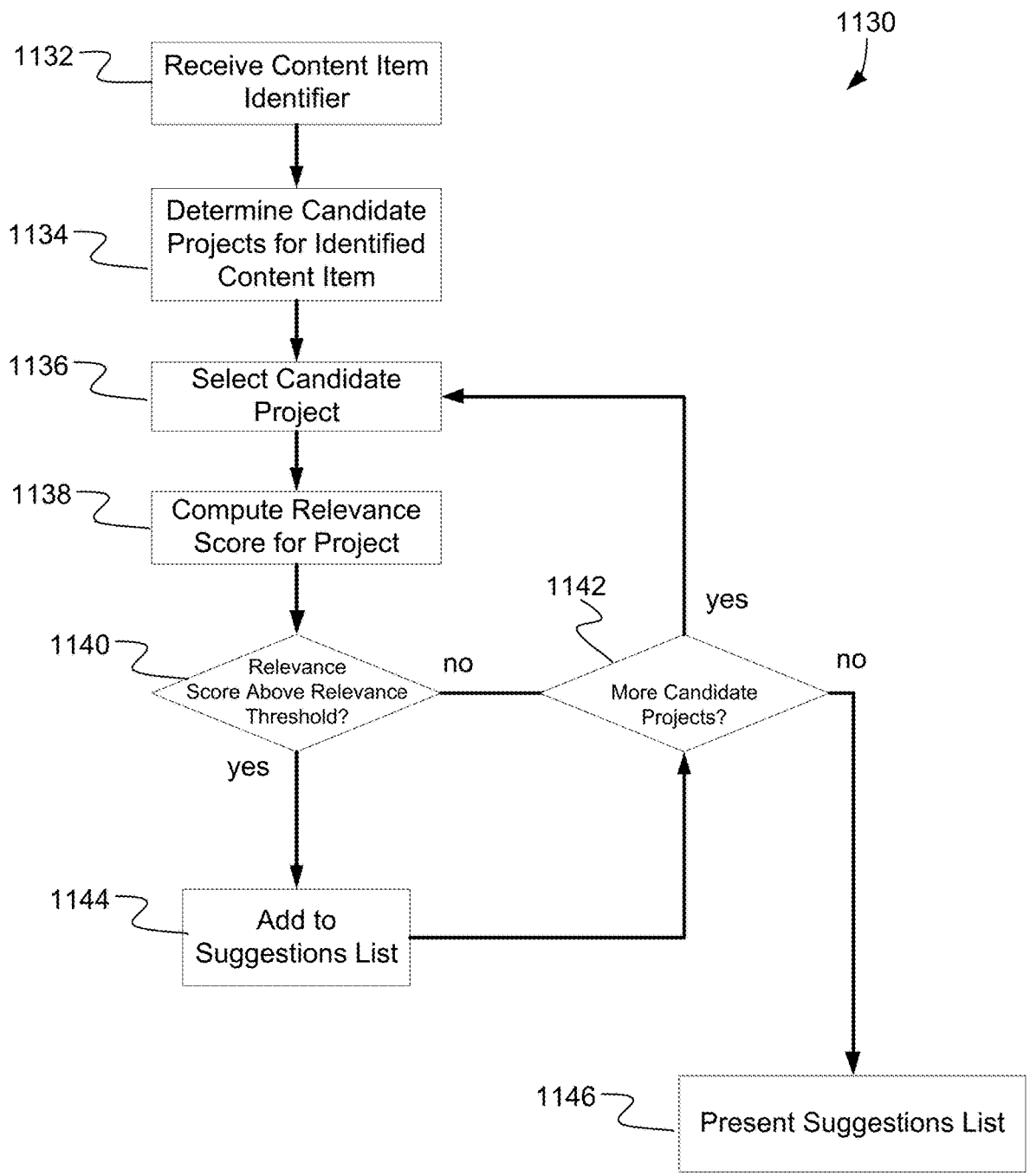
FIG. 11B is a flow diagram of an example process 1130 for generating a project suggestion for a selected content item.

FIG. 11B is a flow diagram of an example process 1130 for generating a project suggestion for a selected content item. For example, content management system 106 can determine associations between the selected content item and users, content items, and/or projects, and make recommendations or suggestions for project to which the selected content item should be added.

At step 1132, content management system 106 can receive a content item identifier. For example, the user of client device 240 can interact with CMS client 242 to select and/or view a content item managed by content management system 106. While viewing the content item, the user can provide input to CMS client 242 to add the selected content item to a project, as described above with reference to FIG. 6A and FIG. 6B. In some implementations, all or part of process 1130 can be initiated by an automated process, such as a process to identify suggestions for existing content items while a server's load is low. In these implementations, process 1130 may not be initiated by user action. In these implementations, content item identifiers can be identified in a variety of ways such as by iterating through the existing content items, selecting high-priority content items, or selecting content items that have not had suggestions determined in a threshold amount of time.

At step 1134, content management system 106 can determine candidate projects for the identified content item. For example, the candidate projects can include all projects managed by content management system 106. The candidate projects can include all projects relevant to the current user of client device 240. For example, the candidate projects can be relevant to a user (or user account) when the user has previously favorited, shared, opened, edited, and/or commented on content items and/or project data associated with the candidate project. The candidate projects can be relevant to a user when the user has been assigned a role in the candidate project or is active within a project. For example, a user's activity level within a candidate project can be measured based on number of content items the user has added to the candidate project, number or volume of edits in content items linked to the candidate project, number of other users the user has invited to join the candidate project, number of tasks created by the user related to the candidate project, and/or number or volume of comments created within the candidate project. A project can be selected as a candidate project when the user's activity level is above some threshold activity level and/or the activities were performed within some threshold period of time. The candidate projects can be added to a collection of candidate projects. Each project in the collection of candidate projects can be analyzed for relevance to the content item identified at step 1132, as described further below.

At step 1136, content management system 106 can select a candidate project. For example, content management system 106 can select a candidate project from the collection of projects generated at step 1134. When content management system selects a candidate project from the collection, content management system 106 can remove the selected candidate project from the collection of candidate projects. Alternatively, content management system can maintain a counter identifying a location in the collection corresponding to the current iteration.

At step 1138, content management system 106 can compute a relevance score for the selected candidate project. For example, content management system 106 can compute a relevance score that represents how relevant the selected candidate project is to the identified content item, as described below with reference to process 1160. In some implementations, computing the relevance score can include logging reasons for the resulting relevance score, such as project membership or content item editing/viewing overlap, content item overlap, subject matter overlap, or other factors described in relation to process 1160.

At step 1140, content management system 106 can determine whether the relevance score for the selected candidate project is above a relevance threshold value. When the relevance score is not above the relevance threshold value, process 1130 can continue to step 1142. When the relevance score is above the relevance threshold value, process 1130 can continue to step 1144.

At step 1142, content management system 106 can determine whether there are more candidate projects in the collection of candidate projects that have not been iterated over. When there are more candidate projects in the collection of candidate projects to analyze, process 1130 can continue to step 1136, as described above. When there are not more candidate projects in the collection of candidate projects to analyze, process 1130 can continue to step 1146.

At step 1144, content management system 106 can add the selected candidate project to a project suggestions list. For example, when the relevance score for the selected candidate project is above a relevance threshold value, indicating the user may want to add the content item to the candidate project, content management system 106 can add the selected candidate project to a project suggestions list. Process 1130 can then continue to step 1142 where content management system 106 can determine whether there are more candidate projects in the collection of candidate projects.

At step 1146, content management system 106 can present the project suggestions list to the user. For example, content management system 106 can generate a project selection view that allows the user to select a project for the identified content item. Content management system 106 can include the projects in the project suggestion list in the project selection view as project recommendations. In some implementations, project recommendations provided in the project selection view can include the corresponding reasons for the recommendation, e.g., the reasons for the corresponding relevance score discussed above. The user can select a recommended or suggested project to add the identified content item to the selected project.

Figure 11C:
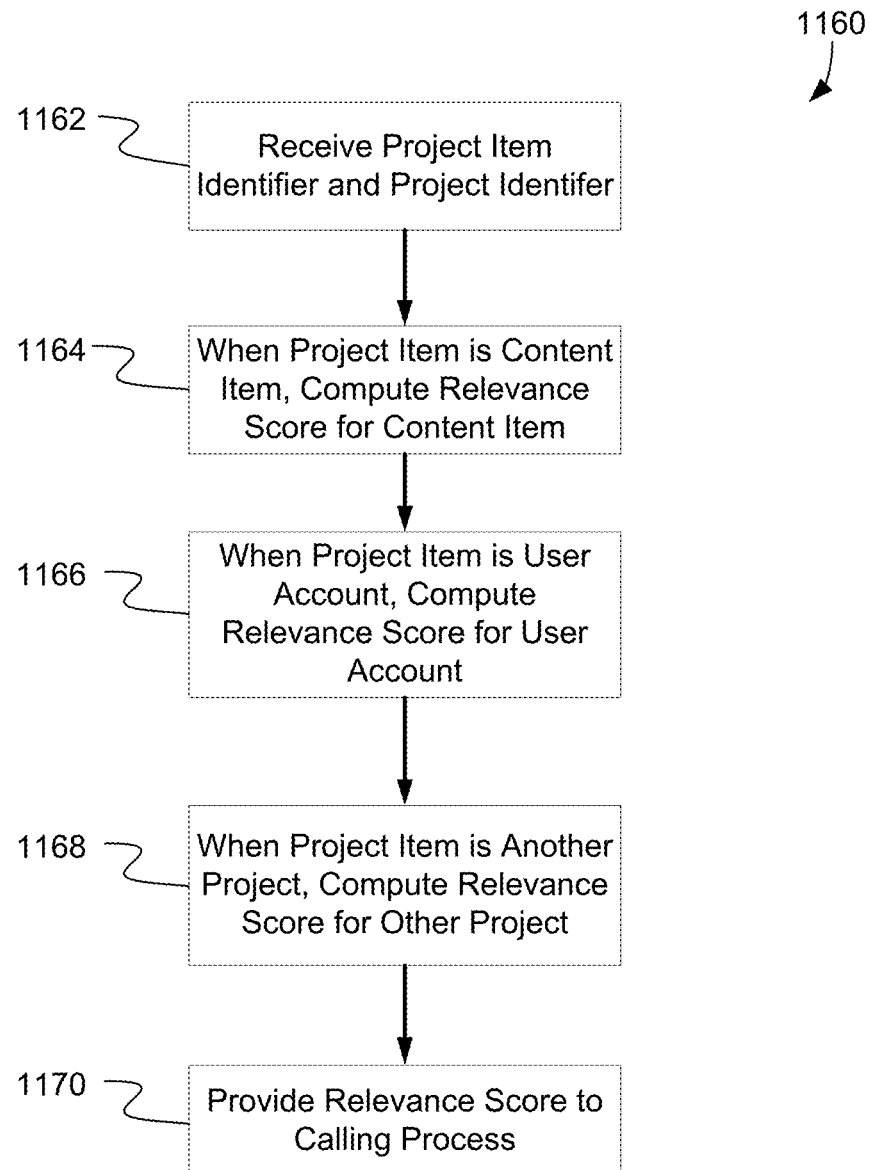
FIG. 11C is a flow diagram of an example process 1160 for generating a relevance score between a project and a project item.

FIG. 11C is a flow diagram of an example process 1160 for generating a relevance score between a project and a project item. For example, process 1160 can be performed by content management system 106 when making suggestions for associating projects and project items (e.g., user accounts, content items, etc.), as described above.

At step 1162, content management system 106 can receive a project item identifier and a project identifier. For example, when process 1160 is performed as part of process 1100 described above, the project identifier can correspond to the project selected by the user and the project item identifier can correspond to the selected candidate project item. As another example, when process 1160 is performed as part of process 1130 described above, the project identifier can correspond to the selected candidate project and the project item identifier can correspond to the content item selected by the user.

At step 1164, when the project item is a content item, content management system 106 can compute a relevance score for the content item. For example, the relevance score can be computed based on natural language semantic similarity (e.g., looking for common keywords/phrases, vector closeness of vector representations of content items or content item portions, employing machine learning models to gauge similarity between language snippets). The relevance score can be computed based on similarities between the project description or title and content item contents (e.g., content item title, entire content item, content item comments, content item metadata). The relevance score can be computed based on similarities between the content item contents and content item contents of content items previously associated with the project. The relevance score can be computed based on analysis of associated multi-media in the content item and multi-media in content items previously associated with the project (e.g., similarity between assigned tags or identified objects). The relevance score can be computed based on sharing history of the content item with a relevant user or a member of the project. The relevance score can be computed based on access and/or edit history of the content item by a relevant user or a member of the project.

At step 1166, when the project item is a user account, content management system 106 can compute a relevance score for the user account. The relevance score can be computed based on how often the user account appears (either as the sharer or recipient) in the sharing history of content items within a project. The relevance score can be computed based on an overlap between identified characteristics of the user account (e.g., sharing history, known team memberships, biographic/demographic characteristics) and characteristics of a project or of other project members. The relevance score can be computed based on a number of calendar events matching calendar events of other project members and/or calendar invites including other project members. The relevance score can be computed based on a number of calendar events and/or invites that are related to the project or content items associated with the project. The relevance score can be computed based on overlap, in the same content items, of task assignments or at '@' mentions indicating the user account. The relevance score can be computed based on level of similarity in content item access, edit history, and/or commenting by the user account in content items related to the project.

At step 1168, when the project item is another project, content management system 106 can compute a relevance score for the other project. The relevance score can be computed based on natural language semantic similarity between (A) the project description, title, or content of project content items and (B) the project description, title, or content of project content items of the other project. The relevance score can be computed based on overlap in content items associated with the project and the other project. The relevance score can be computed based on overlap in user membership between the project and the other project. The relevance score can be computed based on relevance scores between content items in the project and the other project. The relevance score can be computed based on relevance scores between members of the project and members of the other project.

At step 1170, content management system 106 can provide the relevance score to the calling process. For example, after computing the relevance score, content management system 106 can provide the relevance score to process 1100 and/or 1130, as described above. In some implementations, the reasons for how the relevance score was computed at block 164, 166, or 168 can be logged. These reasons can be selected based on how much of an impact they had on the relevance score. For example, such reasons could include "there are 167 content items that overlap between these two projects," "there is an 89% overlap between editors of this content item and project members of this project," "there is a 75% overlap in project membership between the first user and the second user," "there is a high degree of common phrases between the first and second content items," etc. In some implementations, one or more of the reasons can be returned with the relevancy score.

Figure 12:
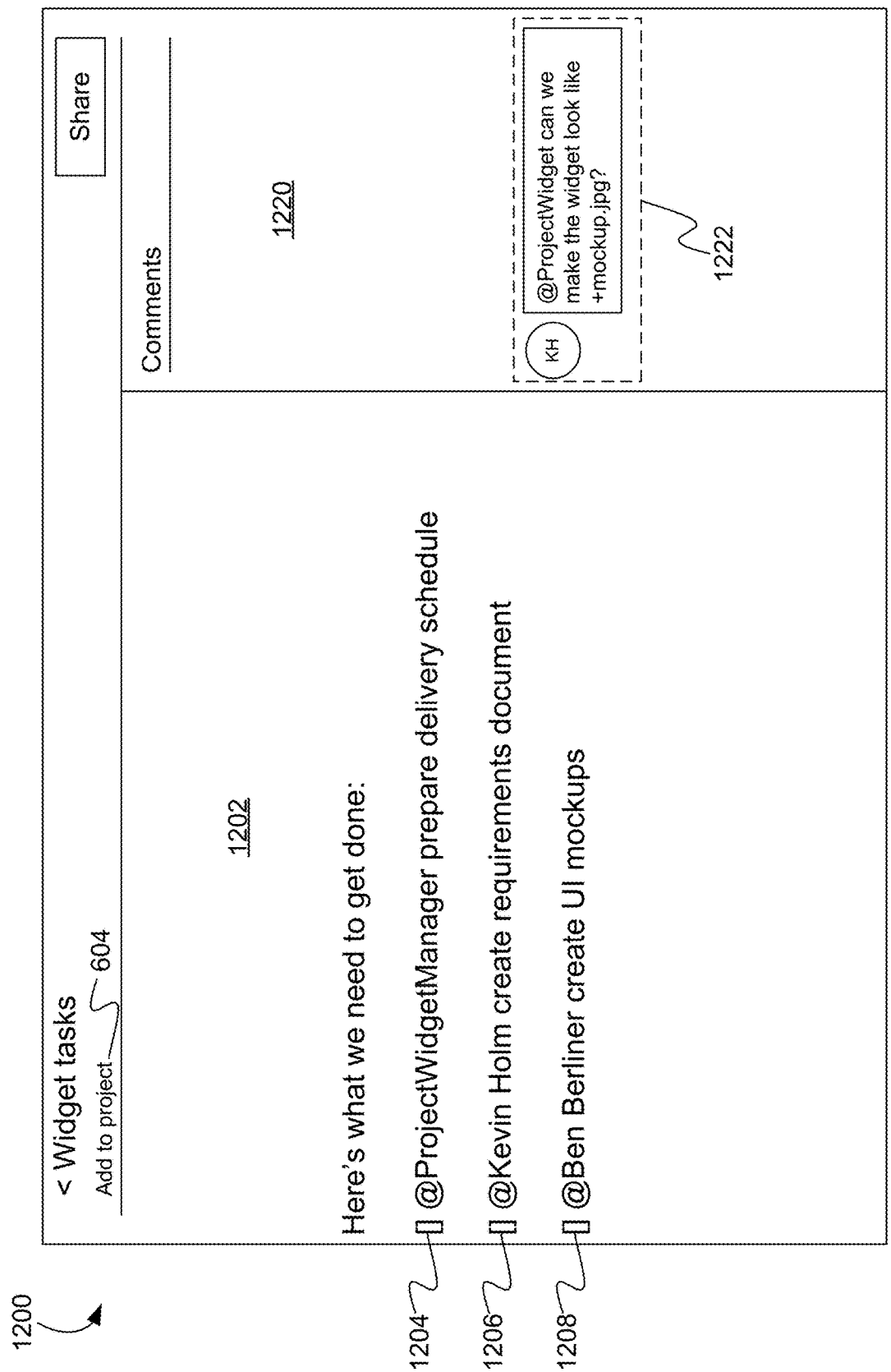
FIG. 12 illustrates an example graphical user interface for defining tasks in a content item.

FIG. 12 illustrates an example graphical user interface 1200 for defining tasks in a content item. For example, GUI 1200 can be presented by CMS client 242 when a user selects a content item managed by content management system 106. For example, GUI 1200 can be a content item editor user interface that allows the user of client device 240 to edit the selected content item.

In some implementations, content management system 106 can create tasks based on the content of a content item. For example, a user can edit a selected content item to define tasks associated with the content item. The user can type expressions, prefixes, and/or symbols that can be interpreted by content management system 106 to define tasks, users to whom the tasks are assigned, due dates, etc. By defining tasks in content items, the content items can be used by project members and other users to group tasks in a logical or meaningful manner. For example, the content item can be named to reflect a related grouping of tasks within a project or subproject. A user viewing a project can use the name of the content item to quickly locate and identify tasks that are relevant to the user.

In some implementations, GUI 1200 can include content area 1202 for presenting the content of the selected content item. The user can provide input to CMS client 242 to add textual content to content area 1202. When the textual content includes a task symbol or expression (e.g., open and closed square brackets "[ ]"), content management system 106 can interpret text following the task symbol or expression as a task definition. For example, each line of text in content area 1202 that starts with the task symbol or expression can define a corresponding task (e.g., task 1204, task 1206, task 1208, etc.).

In some implementations, the user and/or content management system 106 can assign a task to another user of content management system 106. For example, when a task definition includes a user's name or identifier, the task can be assigned to the specified user. For example, a task can be assigned to a user by prefixing a user's identifier with the symbol or character '@,' e.g., using a mention as described above. For example, when a task definition includes the textual expression "@Kevin Holm", content management system 106 can assign the corresponding task to the user "Kevin Holm." Any changes to the task assigned to the user identified in the task definition will cause the identified user to receive a notification that includes a description of the changes made to the task.

In some implementations, the user and/or content management system 106 can assign a task to a role defined in content management system 106. For example, when a task definition includes a project name and/or role, the task can be assigned to the user who is currently assigned the specified role. For example, a task can be assigned to a role by prefixing the role identifier with the symbol or character '@'. For example, when a task definition includes the textual expression "@ProjectWidgetManager", content management system 106 can assign the corresponding task to the user who currently has the project manager role for the project "Project Widget." Any changes to the task assigned to the role identified in the task definition will cause the corresponding user to receive a notification that includes a description of the changes made to the task. In some implementations, assignment of a task to a project role can be accomplished by just specifying the role identifier, without an identifier of the project. For example, "[ ]@techLead build web interface" can create a "build web interface" task assigned to the role of techLead for whatever project the content item is currently linked to. This task assignment can be dynamic, updating as the role changes or when the content item is linked to additional or different projects. In some implementations, if the content item is linked to multiple projects that all have this role, multiple users can be assigned to the task.

In some implementations, GUI 1200 can include comments area 1220. For example, comments area 1220 can include comments made by various users with respect to the selected content item. For example, a user can select a portion of content (e.g., a task) in content area 1202 and provide textual input to comment on the selected portion of content. For example, the user Kevin Holm can create comment 1222 after selecting task 1208 to generate a comment with respect to task 1208. Since the comment is associated with task 1208, the user assigned task 1208 (e.g., Ben Berliner) can receive a notification describing the comment made by Kevin Holm.

In some implementations, a user can direct a comment to a user and/or role. Similar to tasks above, a user can use an assignment prefix (e.g., '@') to direct a comment to a particular user (e.g., "@Ben Berliner") or to a particular role (e.g., "@ProjectWidgetManager" or "@Manager"). After the comment is created, content management system 106 can send a notification to the identified user or role describing the comment. Since comment 1222 is directed to "Project Widget" (e.g., "@ProjectWidget"), content management system 106 can send a notification to all members/users associated with Project Widget that describes comment 1222. Thus, comments, tasks, etc., can be directed at users, roles, and/or projects using the assignment prefix '@'.

Figure 13:
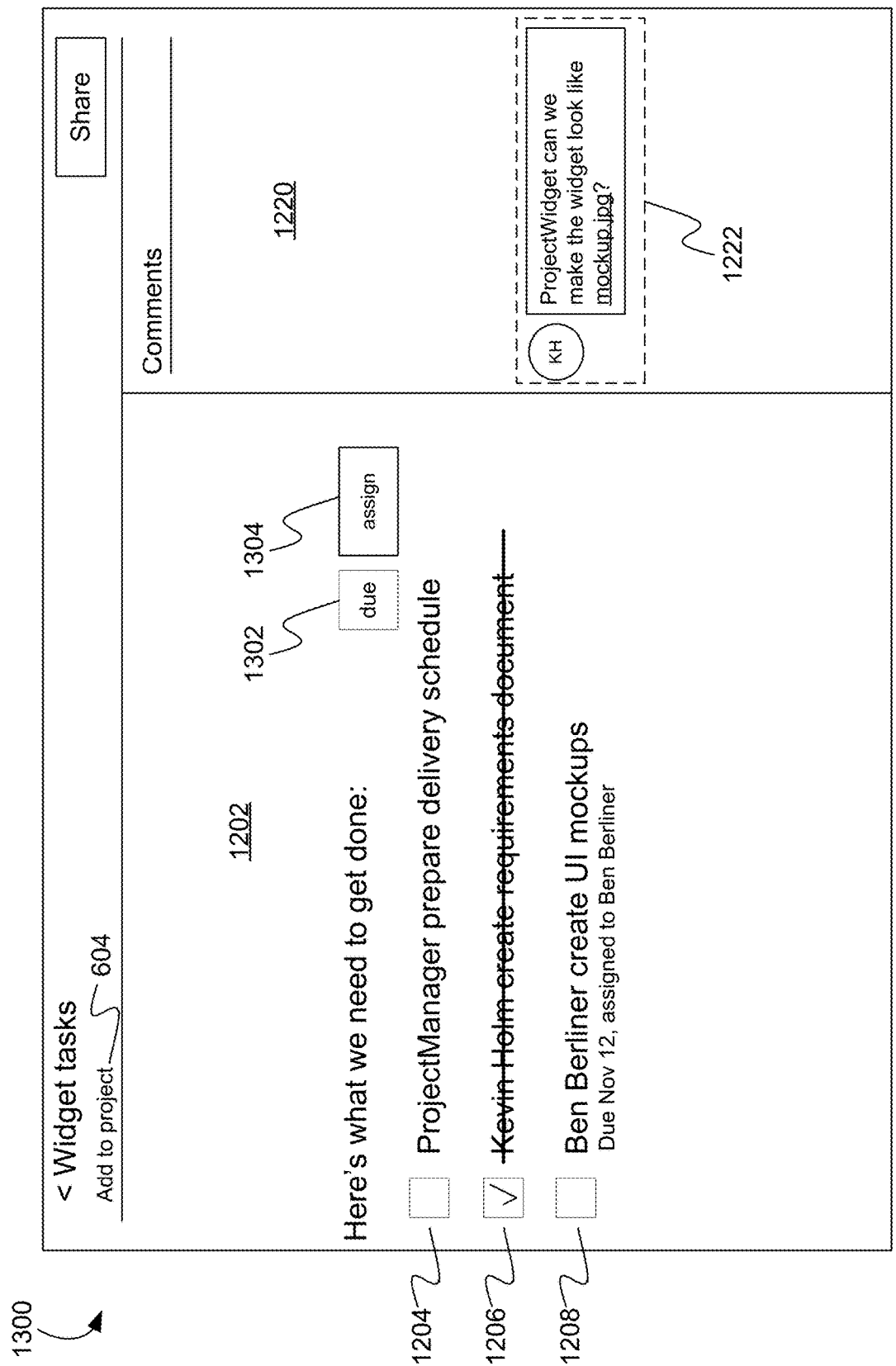
FIG. 13 illustrates an example graphical user interface for updating tasks in a content item.

FIG. 13 illustrates an example graphical user interface 1300 for updating tasks in a content item. For example, GUI 1300 can be presented by CMS client 242 on a display of client device 240. For example, GUI 1300 can correspond to GUI 1200 described above.

As described above, content management system 106 can notify project members of changes made to project content items. For example, when a content item is added to a project, content management system 106 can share the added content item with all members of the project. Whenever a change is made to a project content item, all members of the project, members in specific roles, or members with specific affiliations to the project (e.g., indicated they are following the project, have edited a content item linked to the project, etc.) can be notified of the changes. Thus, when a content item that includes tasks is updated to reflect changes to the tasks defined by the content item, content management system 106 can notify the relevant members of the corresponding project of the changes to the content item and/or tasks. For example, when a user changes a task definition, due date, assignment, and/or completion status of a task defined in a project content item, content management system 106 can notify the relevant members of the corresponding project of the changes to the task and/or content item.

In some implementations, GUI 1300 can include graphical element 1302 for specifying a due date for a task. For example, a user of client device 240 can provide input to CMS client 242 selecting task 1204 presented on GUI 1300. The user can, for example, select the text of task 1204 by providing explicit input selecting task 1204 or by hovering a cursor over task 1204. In response to the selection of task 1204, CMS client 242 can present graphical element 1302. In some implementations, graphical element 1302 can be automatically displayed for a task without having the corresponding task selected by a user. The user can select graphical element 1302 to cause CMS client 242 to present an input (e.g., a text field or calendar control) for selecting a due date for the selected task. After receiving user input selecting the due date for the selected task, CMS client 242 can send the due date for the task to content management system 106 to update the task data with the new due date. Content management system 106 can send notifications to the appropriate users, as described above, informing the users of the new due date. CMS client 242 can present the due date information on GUI 1300, as illustrated by task 1208.

In some implementations, GUI 1300 can include graphical element 1304 for specifying a user responsible for performing a task. For example, a user of client device 240 can provide input to CMS client 242 selecting task 1204 presented on GUI 1300. The user can, for example, select the text of task 1204 by providing explicit input selecting task 1204 or by hovering a cursor over task 1204. In response to the selection of task 1204, CMS client 242 can present graphical element 1304. In some implementations, graphical element 1304 can be automatically displayed for a task without having the corresponding task selected by a user. The user can select graphical element 1304 to cause CMS client 242 to present a user selection control for selecting one or more users to assign to the selected task. This can be an additional way to assign a task to a user in addition to or as an alternative to using mentions as discussed above. In some implementations, a representation of the users assigned to a task can be displayed in place of graphical element 1304. In some implementations, where there are multiple users assigned to a task, the representation of the users assigned to a task can be a face pile, as described above. After receiving user input assigning one or more users for the selected task, CMS client 242 can send the user assignment for the task to content management system 106 to update the task data with the new assigned user(s). Content management system 106 can send notifications to the appropriate users, as described above, informing the users of the new user assignment. CMS client 242 can present the user assignment information on GUI 1300, as illustrated by task 1208.

In some implementations, GUI 1300 can modify the presentation of a task to indicate task status. For example, a user can provide input changing the status of a task presented on GUI 1300. For example, the user can select a checkbox associated with task 1206 to indicate that task 1206 has been completed. In response to receiving the input, CMS client 242 can send the updated status for the task to content management system 106. Content management system 106 can send notifications to the appropriate users, as described above, informing the users of the new status of the task (e.g., completed). CMS client 242 can modify the appearance of task 1206 to indicate that the task has been completed. For example, CMS client 242 can present task 1206 with a line through the task to indicate that the task has been completed.

Figure 14:
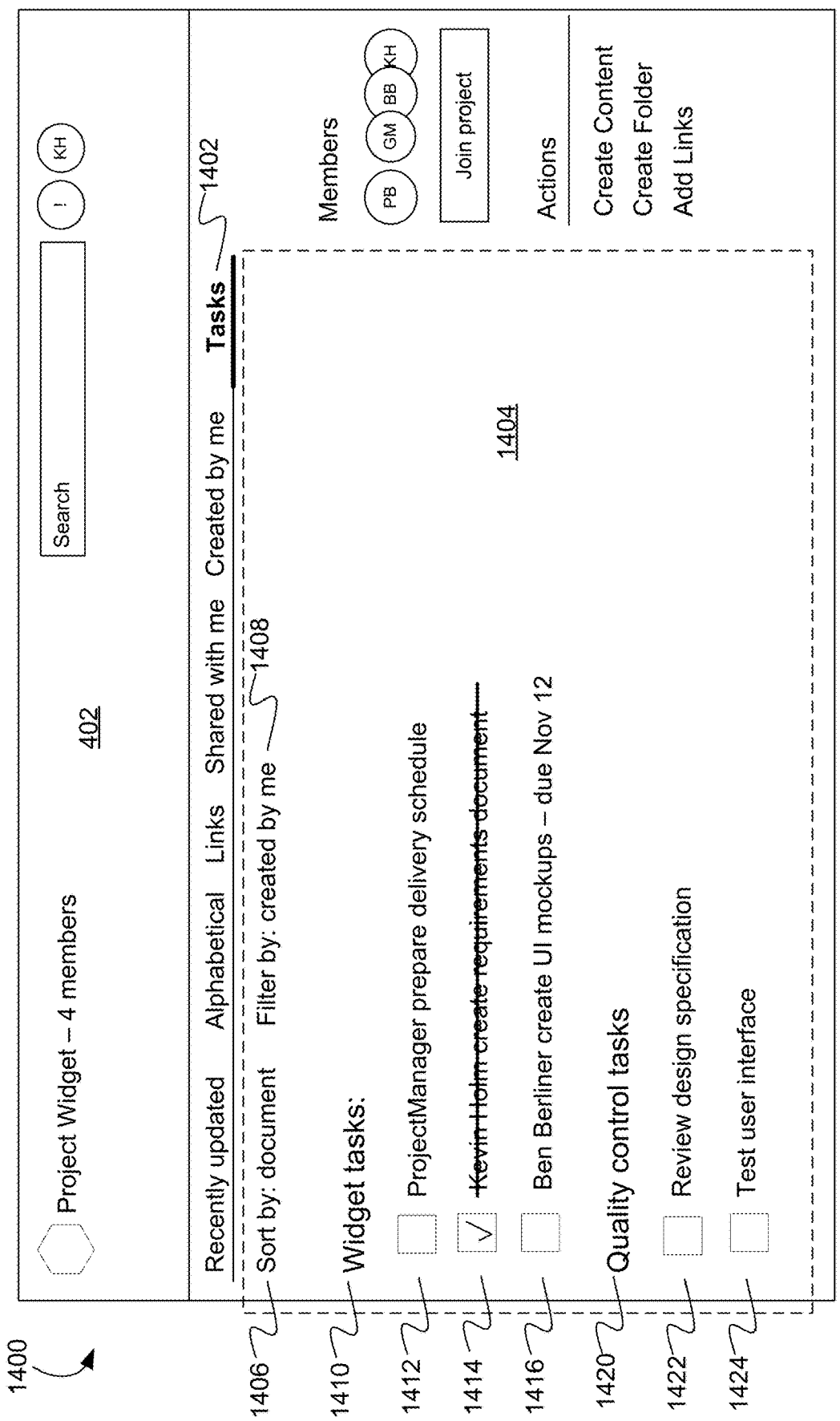
FIG. 14 illustrates an example graphical user interface that presents tasks associated with a selected project.

FIG. 14 illustrates an example graphical user interface 1400 that presents tasks associated with a selected project. For example, GUI 1400 can correspond to GUI 400 of FIG. 4. GUI 1400 can be presented by CMS client 242 on a display of client device 240 in response to the user selecting graphical element 1402. For example, the user can select graphical element 1402 to cause CMS client 242 and/or content management system 106 to generate and/or present task view 1404 that presents tasks associated with the currently selected project.

In some implementations, task view 1404 can include graphical element 1406 for specifying sorting parameters for tasks associated with the selected project. For example, the user can select graphical element 1406 to present options for sorting the various tasks associated with the currently selected project presented by GUI 1400. In some implementations, CMS client 242 can sort tasks based on the content item in which the tasks are defined. For example, in response to receiving input indicating that the user would like to sort tasks by content item, CMS client 242 can present, in task view 1404, tasks grouped by content item, as illustrated by view 1404. For example, all tasks (e.g., task 1412, task 1414, task 1416, etc.) that are defined in content item 1410 (e.g., "Widget tasks"), can be grouped and presented together by CMS client 242. Similarly, all tasks (e.g., task 1422, task 1424, etc.) defined in content item 1420 (e.g., "Quality control tasks") can be grouped and presented together by CMS client 242. These groups of tasks can be organized under a heading corresponding to a title or filename of the content item in which the tasks are defined. Other sorting options can include sorting by task creation date, task due date, task assignments, etc.

In some implementations, task view 1404 can include graphical element 1408 for specifying filtering parameters for tasks associated with the selected project. For example, the user can select graphical element 1408 to specify a filtering option for the tasks associated with the currently selected project. For example, the filtering options can include showing only tasks created by the user, showing only tasks assigned to the user, and/or showing all tasks associated with the selected project (e.g., no filter). When the user selects a filtering option, CMS client 242 can present tasks according to the selected filtering option. Thus, CMS client 242 may show only tasks assigned to the user, only tasks created by the user, and/or all project tasks depending on the filtering option selected.

In some implementations, the user can modify tasks in task view 1404. For example, when a user provides input to modify or update a task, a corresponding change can be made to the content item in which the task is defined. For example, a user can select the checkbox associated with task 1414 presented in task view 1404 to indicate that the task 1414 has been completed. In response to receiving the input, CMS client 242 can send the updated task status to content management system 106. Content management system 106 can update the task status in the "Widget tasks" content item to indicate that the corresponding task has been completed. Thus, when the user subsequently opens the "Widget tasks" content item, the user can see that the task has been updated. Moreover, since modifying a task in task view 1404 causes a corresponding change to the task-defining content item, all users with whom the content item is shared will get notified of the update to the task, as described above. Similarly, the user can update the task description, due date, assignment, comment on a task, and/or make any other task-related update through task view 1404 to cause a corresponding change in the content item in which the task is defined.

Figure 15A:
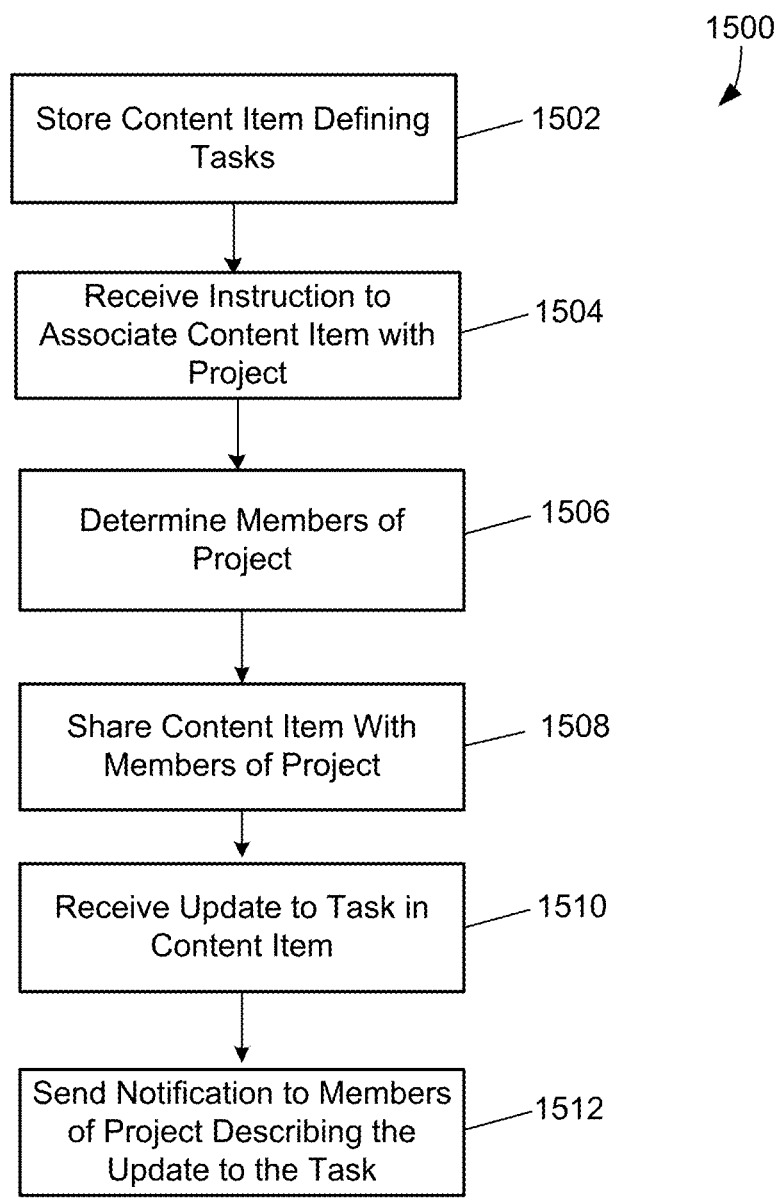
FIG. 15A is a flow diagram of an example process 1500 for managing tasks using content items.

FIG. 15A is a flow diagram of an example process 1500 for managing tasks using content items. For example, process 1500 can be performed by content management system 106 to manage tasks using content items. The tasks can be associated with users and/or projects by sharing the content items with users and/or adding the content items to projects. Thus, the organization and maintenance of task data can be simplified using content items as task containers.

At step 1502, content management system 106 can store a content item that includes task definitions. For example, a user of CMS client 242 and/or content management system 106 can create a content item and define tasks within the content item, as described above. The user can create tasks using various expressions, prefixes, and symbols to define the various attributes of the tasks using text, as described above.

At step 1504, content management system 106 can receive an instruction to associate the content item with a project. For example, the user can provide input to CMS client 242 to add the content item to a project, as described above with reference to FIG. 6.

At step 1506, content management system 106 can determine members of the project. For example, each project can include members (e.g., users of content management system 106) who have access to the project and/or can modify content items, membership, and/or other attributes of the project. Content management system 106 can store project metadata identifying which users are members of the project. Thus, content management system 106 can determine members of the project based on the project metadata.

At step 1508, content management system 106 can share the content item with members of the project. For example, content management system can grant all project members, project members with particular roles, or project members that have above an activity threshold within the project, permission to view and/or edit content items associated with the project.

At step 1510, content management system 106 can receive an update to a task defined in the content item. For example, a user of content management system 106 can update a task by adding a due date to the task, assigning the task to one or more users, commenting on the task, changing the task description, and/or changing the status of the task.

At step 1512, content management system 106 can send a notification to the members of the project describing the update to the task. For example, since content management system 106 sends notifications to users with whom a content item is shared when the content item is modified, content management system 106 can send a notification to all or particular members of the project when the task defined within the content item is updated. Thus, content management system 106 can inform all or some members of the project of changes to tasks when a user modifies a task defined by the content item.

Figure 15B:
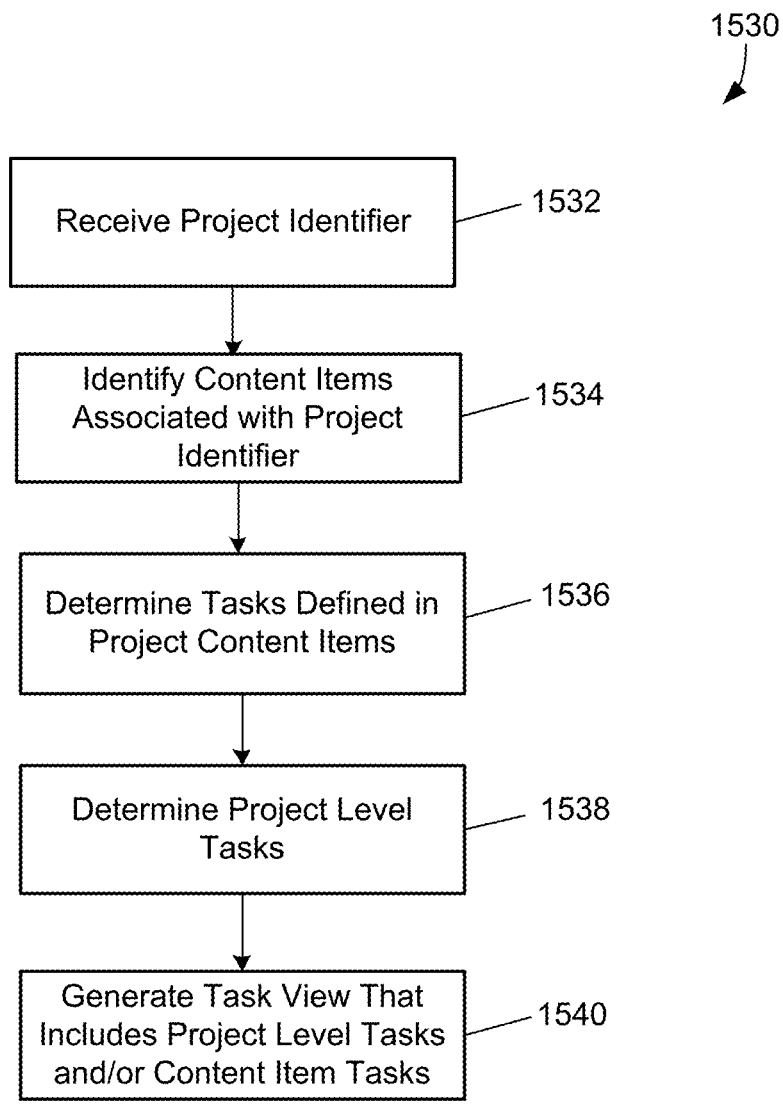
FIG. 15B is a flow diagram of an example process 1530 for determining tasks associated with a project.

FIG. 15B is a flow diagram of an example process 1530 for determining tasks associated with a project. For example, process 1530 can be performed by content management system 106 in response to a request for a task view from CMS client 242. Content management system 106 can determine which tasks are associated with a project by performing process 1530, generate the task view that includes the determined tasks, and send the task view to CMS client 242 for presentation on a display of client device 240.

At step 1532, content management system 106 can receive a project identifier. For example, content management system 106 can receive the project identifier from CMS client 240 when a user provides input to CMS client 240 identifying a project for which the user would like to view associated tasks.

At step 1534, content management system 106 can identify content items associated with the project identifier. For example, content management system 106 can determine which content items are mapped to the project identifier in the project data managed by content management system 106.

At step 1536, content management system 106 can determine tasks defined in the project content items. For example, content management system 106 can parse the content items identified at step 1534 to determine whether the content items include task definitions, as described above.

At step 1538, content management system 106 can determine project level tasks. For example, project level tasks can be tasks that are defined externally to project content items. For example, a user can define a task by providing task definitions and/or task attributes as input to a project view generated by content management system 106 and presented on a display of client device 240 by CMS client 242. When a user provides input to define a project level task, CMS client 242 can send the task definition to content management system 106 and content management system 106 can store the project level task definition in the project data associated with the identified project. Thus, content management system 106 can determine or obtain project level tasks by parsing the project data associated with the project identifier.

At step 1540, content management system 106 can generate a task view that includes project level tasks and/or content item tasks. For example, a project can include both project level tasks and/or tasks defined in content items. Thus, when CMS client 242 requests a project task view from content management system 106, content management system 106 can generate a task view that may include project level tasks and/or content items tasks. In some implementations, the tasks presented on the task view can be filtered such that only tasks assigned to the user of client device 240 are presented on the task view when CMS client 242 on client device 240 is requesting the task view. Content item tasks, in the project view, can be displayed under a heading corresponding to the title or filename of the content item in which the task is defined. Project level tasks, in the project view, can be displayed under a heading corresponding to the title of the project. In some implementations, when a first project is linked under a second project the project level tasks of the second project can be displayed, in the task list for the first project, under a heading corresponding to the title of the second project. Tasks defined in content items linked to the second project may be excluded from the task list for the first project or may be displayed under subheadings under the heading corresponding to the title of the second project. When a content item is associated with multiple projects, the tasks defined in the content item may appear in the project task views for the multiple projects.

Figure 16A:
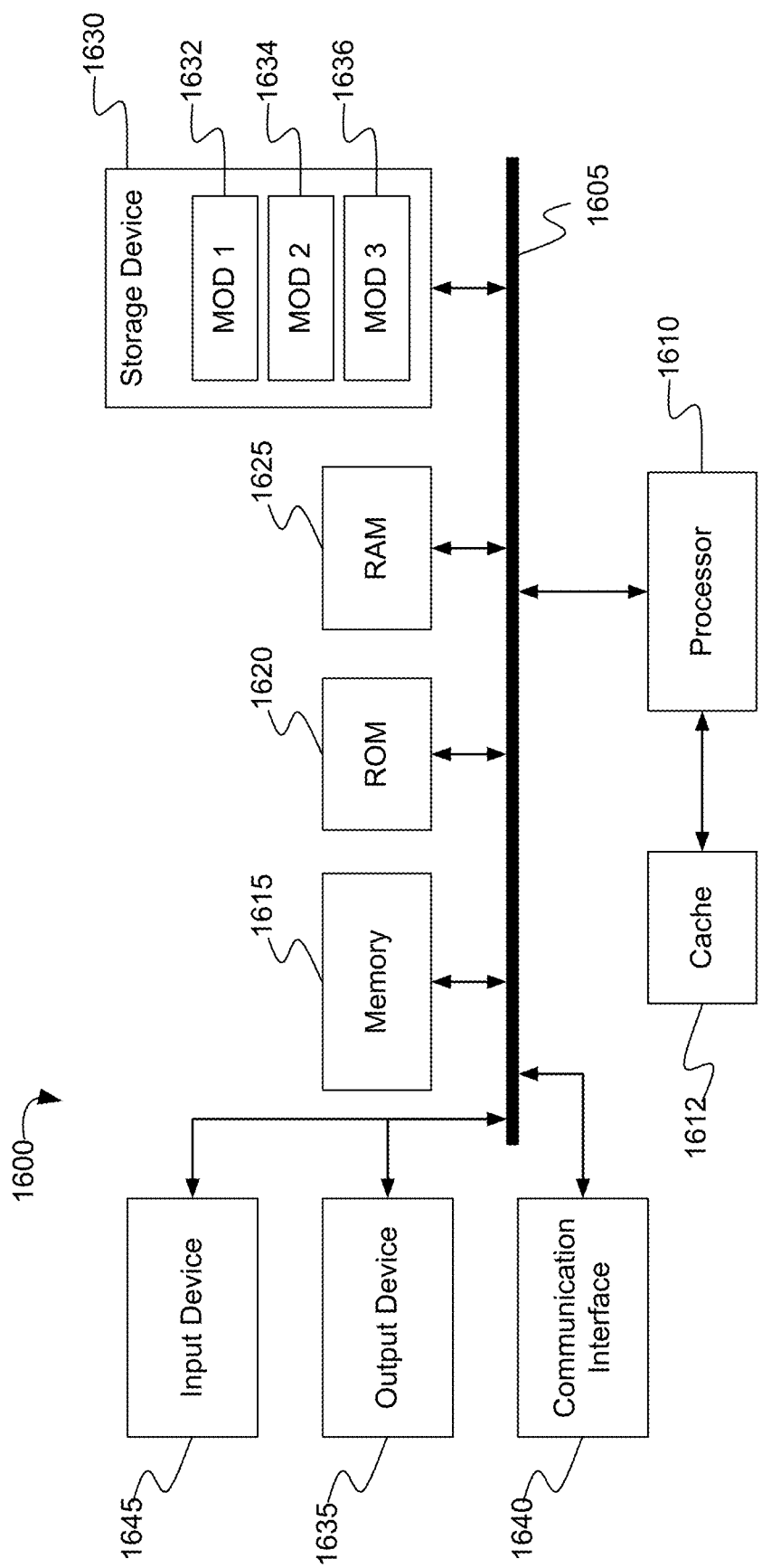
FIG. 16A shows an example possible system embodiment for implementing various embodiments of the present technology.
Figure 16B:
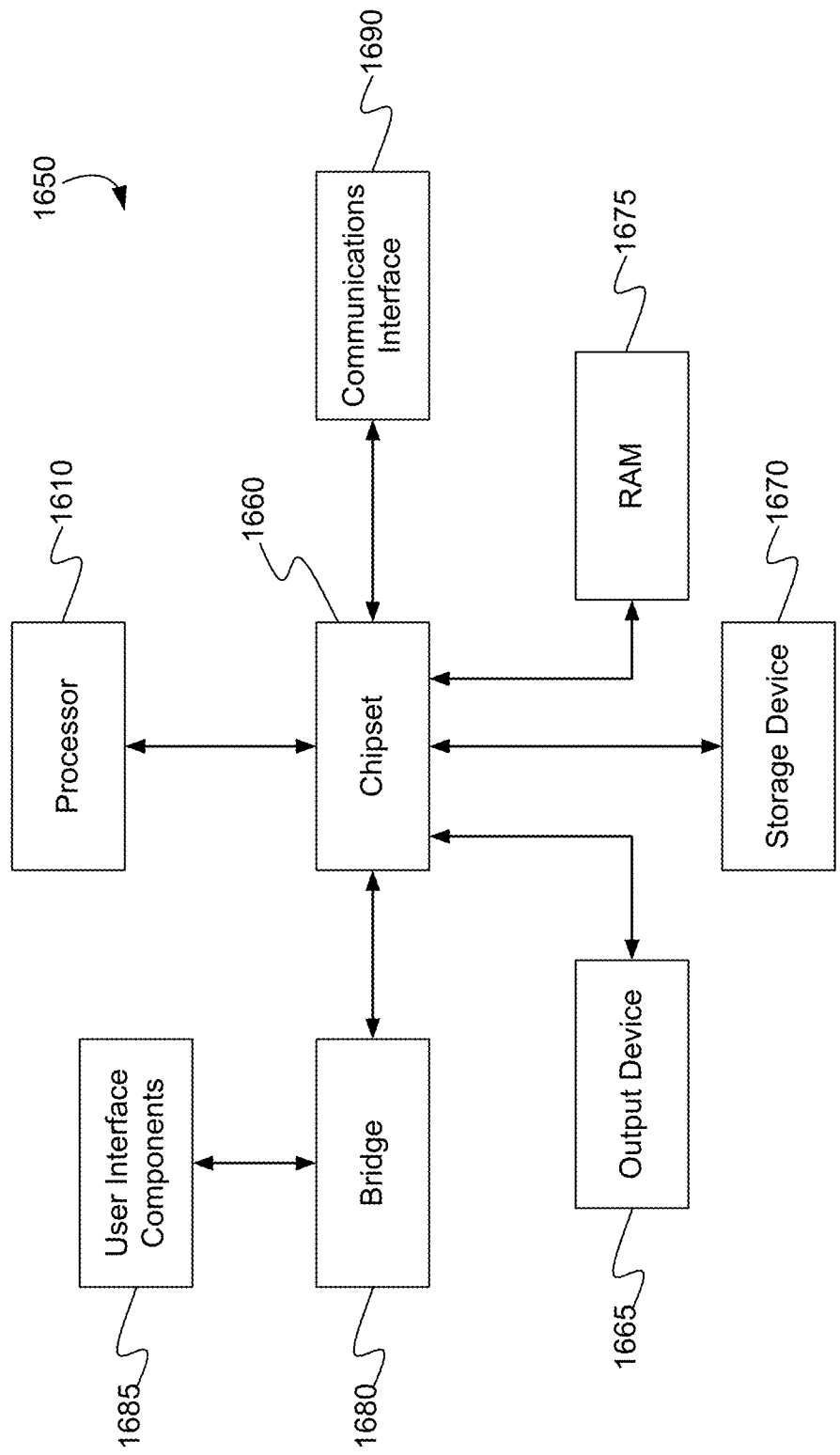
FIG. 16B shows an example possible system embodiment for implementing various embodiments of the present technology.

FIG. 16A and FIG. 16B show example possible system embodiments. The more appropriate embodiment will be apparent to those of ordinary skill in the art when practicing the present technology. Persons of ordinary skill in the art will also readily appreciate that other system embodiments are possible.

FIG. 16A illustrates a conventional system bus computing system architecture 1600 wherein the components of the system are in electrical communication with each other using a bus 1605. Example system 1600 includes a processing unit (CPU or processor) 1610 and a system bus 1605 that couples various system components including the system memory 1615, such as read only memory (ROM) 1620 and random access memory (RAM) 1625, to the processor 1610. The system 1600 can include a cache of high-speed memory connected directly with, in close proximity to, or integrated as part of the processor 1610. The system 1600 can copy data from the memory 1615 and/or the storage device 1630 to the cache 1612 for quick access by the processor 1610. In this way, the cache can provide a performance boost that avoids processor 1610 delays while waiting for data. These and other modules can control or be configured to control the processor 1610 to perform various actions. Other system memory 1615 may be available for use as well. The memory 1615 can include multiple different types of memory with different performance characteristics. The processor 1610 can include any general purpose processor and a hardware module or software module, such as module 1 1632, module 2 1634, and module 3 1636 stored in storage device 1630, configured to control the processor 1610 as well as a special-purpose processor where software instructions are incorporated into the actual processor design. The processor 1610 may essentially be a completely self-contained computing system, containing multiple cores or processors, a bus, memory controller, cache, etc. A multi-core processor may be symmetric or asymmetric.

To enable user interaction with the computing device 1600, an input device 1645 can represent any number of input mechanisms, such as a microphone for speech, a touch-sensitive screen for gesture or graphical input, keyboard, mouse, motion input, speech and so forth. An output device 1635 can also be one or more of a number of output mechanisms known to those of skill in the art. In some instances, multimodal systems can enable a user to provide multiple types of input to communicate with the computing device 1600. The communications interface 1640 can generally govern and manage the user input and system output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof.

The storage device 1630 can include software modules 1632, 1634, 1636 for controlling the processor 1610. Other hardware or software modules are contemplated. The storage device 1630 can be connected to the system bus 1605. In one aspect, a hardware module that performs a particular function can include the software component stored in a computer-readable medium in connection with the necessary hardware components, such as the processor 1610, bus 1605, display 1635, and so forth, to carry out the function.

FIG. 16B illustrates a computer system 1650 having a chipset architecture that can be used in executing the described method and generating and displaying a graphical user interface (GUI). Computer system 1650 is an example of computer hardware, software, and firmware that can be used to implement the disclosed technology. System 1650 can include a processor 1610, representative of any number of physically and/or logically distinct resources capable of executing software, firmware, and hardware configured to perform identified computations. Processor 1610 can communicate with a chipset 1660 that can control input to and output from processor 1610. In this example, chipset 1660 outputs information to output 1665, such as a display, and can read and write information to storage device 1670, which can include magnetic media, and solid state media, for example. Chipset 1660 can also read data from and write data to RAM 1675. A bridge 1680 for interfacing with a variety of user interface components 1685 can be provided for interfacing with chipset 1660. Such user interface components 1685 can include a keyboard, a microphone, touch detection and processing circuitry, a pointing device, such as a mouse, and so on. In general, inputs to system 1650 can come from any of a variety of sources, machine generated and/or human generated.

Chipset 1660 can also interface with one or more communication interfaces 1690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1610 analyzing data stored in storage 1670 or 1675. Further, the machine can receive inputs from a user via user interface components 1685 and execute appropriate functions, such as browsing functions by interpreting these inputs using processor 1610.

It can be appreciated that example systems 1600 and 1650 can have more than one processor 1610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Moreover, claim language reciting "at least one of" an element or another element refers to any possible permutation of the set of elements. For example, claim language reciting "at least one of A and B" or "at least one of A or B" means "A, B, or both A and B."

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, by a content management system, an identification of a first project;
   identifying, by the content management system, multiple content items associated with the first project;
   determining, by the content management system, a first set of tasks defined in a first content item of the multiple content items associated with the first project, wherein the first set of tasks includes at least one task assigned to a first user;
   determining, by the content management system, a second set of tasks defined in a second content item of the multiple content items, wherein the second set of tasks comprises at least one task assigned to another user; and
   creating, by the content management system, a first project task list for the first project, wherein the first project task list includes:
   a first heading based on the first content item;
   a second heading based on the second content item;
   the first set of tasks organized under the first heading; and
   the second set of tasks organized under the second heading.

2. The method of claim 1, further comprising:
   receiving an identification of a second project;
   identifying multiple content items associated with the second project, including the first content item and a third content item;
   determining a third set of tasks defined in the third content item of the multiple content items associated with the second project; and
   creating a second project task list for the second project that includes the first set of tasks and the third set of tasks.

3. The method of claim 1, further comprising:
   determining a fourth set of project level tasks for the first project, the project level tasks not defined within a content item,
   wherein the first project task list for the first project further includes:
   a third heading based on a project identifier for the first project; and
   the fourth set of project level tasks organized under the third heading.

4. The method of claim 1, further comprising:
   receiving an identifier corresponding to a user of the content management system,
   wherein creating the first project task list includes filter out tasks that are not assigned to the user corresponding to the identifier.

5. The method of claim 1, further comprising:
   receiving an indication that a particular task defined in the first content item has been completed;
   determining one or more projects associated with the first content item; and
   causing a notification to be presented to at least one user associated with each of the one or more projects indicating that the particular task has been completed.

6. The method of claim 1, further comprising:
receiving input adding a new task to the first content item;
determining one or more projects associated with the first content item; and
causing a notification to be presented to at least one user associated with each of the one or more projects indicating that a new task has been added to the first content item.

7. The method of claim 1, further comprising:
receiving input specifying a comment related to a task specified in the first content item;
determining one or more projects associated with the first content item; and
causing a notification to be presented to at least one user associated with each of the one or more projects describing the comment related to the task.

8. A non-transitory computer-readable medium including one or more sequences of instructions that, when executed by a computing system, cause the computing system to perform operations comprising:
receiving an identification of a first project;
identifying a first content item associated with the first project;
determining a first set of tasks defined in the first content item, wherein the first set of tasks comprises at least one task assigned to a first user and at least one task assigned to a user other than the first user; and
creating a first version of a project task list for the first project, wherein the first version of the project task list includes:
a first heading based on the first content item; and
the first set of tasks organized under the first heading.

9. The non-transitory computer-readable medium of claim 8, wherein the operations further comprise:
receiving an identification of a second project;
identifying multiple content items associated with the second project, including the first content item and a third content item;
determining a third set of tasks defined in the third content item of the multiple content items associated with the second project; and
creating a second project task list for the second project that includes the first set of tasks and the third set of tasks.

10. The non-transitory computer-readable medium of claim 8,
wherein the operations further comprise determining a fourth set of project level tasks for the first project, the project level tasks not defined within a content item; and
wherein the first version of the project task list for the first project further includes:
a third heading based on a project identifier for the first project; and
the fourth set of project level tasks organized under the third heading.

11. The non-transitory computer-readable medium of claim 8,
wherein the operations further comprise receiving an identifier corresponding to a user of a content management system, and
wherein creating the first project task list includes filter out tasks that are not assigned to the user corresponding to the identifier.

12. The non-transitory computer-readable medium of claim 11, further comprising:
identifying a second content item associated with the first project;
determining a second set of tasks defined in the second content item; and
creating a second version of the project task list for the first project, wherein the second version of the project task list includes:
the first heading based on the first content item;
a second heading based on the second content item;
the first set of tasks organized under the first heading; and
the second set of tasks organized under the second heading.

13. The non-transitory computer-readable medium of claim 12, wherein receiving a user modification, to a particular task in the second version of the project task list, causes, when a particular content item including the particular task is displayed, the particular task to be displayed in the particular content item with a representation of the user modification.

14. The non-transitory computer-readable medium of claim 13, wherein the user modification comprises one or more of: marking the particular task as complete, assigning a date to the particular task, associating the task with a particular user of a content management system, or any combination thereof.

15. A system comprising:
one or more processors; and
a non-transitory computer-readable medium including one or more instructions that, when executed by the one or more processors, cause the system to perform operations comprising:
receiving a command to display a task list for a first project; and
in response to the command, providing a first project task list for the first project, wherein the first project task list includes:
a first set of tasks corresponding to tasks defined in a first content item associated with the first project, wherein the first set of tasks comprises at least one task assigned to a first user; and
a second set of tasks corresponding to tasks defined in a second content item associated with the first project, wherein the second set of tasks comprises at least one task assigned to another user.

16. The system of claim 15, wherein the operations further comprise:
receiving an identification of a second project;
identifying multiple content items associated with the second project, including the first content item and a third content item;
determining a third set of tasks defined in the third content item of the multiple content items associated with the second project; and
creating a second project task list for the second project that includes the first set of tasks and the third set of tasks.

17. The system of claim 15,
wherein the operations further comprise determining a fourth set of project level tasks for the first project, the project level tasks not defined within a content item; and
wherein the first project task list for the first project further includes the fourth set of project level tasks.

18. The system of claim 17,
wherein the first project task list further includes a heading based on a project identifier for the first project; and
wherein the fourth set of project level tasks are under the heading.

19. The system of claim 15,
wherein the first project task list further includes a first heading based on the first content item and a second heading based on the second content item; and
wherein the first set of tasks are under the first heading and the second set of tasks are under the second heading.

20. The system of claim 15,
wherein a particular task in the first set of tasks is defined in the first content item with a corresponding date; and
wherein the particular task is associated, in the first project task list, with an indication of the corresponding date.

* * * * *